(12) United States Patent
Rusanovskyy et al.

(10) Patent No.: US 11,375,212 B2
(45) Date of Patent: Jun. 28, 2022

(54) FLEXIBLE CHROMA PROCESSING FOR DYNAMIC RANGE ADJUSTMENT

(71) Applicant: QUALCOMM Incorporated, San Diego, CA (US)

(72) Inventors: Dmytro Rusanovskyy, San Diego, CA (US); Yan Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/231,935

(22) Filed: Apr. 15, 2021

(65) Prior Publication Data

US 2021/0329273 A1 Oct. 21, 2021

Related U.S. Application Data

(60) Provisional application No. 63/012,133, filed on Apr. 18, 2020.

(51) Int. Cl.
| | | |
|---|---|---|
| *H04N 19/186* | (2014.01) | |
| *H04N 19/103* | (2014.01) | |
| *H04N 19/132* | (2014.01) | |
| *H04N 19/136* | (2014.01) | |
| *H04N 19/176* | (2014.01) | |
| *H04N 19/70* | (2014.01) | |

(52) U.S. Cl.
CPC ......... *H04N 19/186* (2014.11); *H04N 19/103* (2014.11); *H04N 19/132* (2014.11); *H04N 19/136* (2014.11); *H04N 19/176* (2014.11); *H04N 19/70* (2014.11)

(58) Field of Classification Search
CPC .......................... H04N 19/147; H04N 19/119
See application file for complete search history.

(56) References Cited

U.S. PATENT DOCUMENTS

2017/0085894 A1\* 3/2017 Ramasubramonian ..................... H04N 19/132
2019/0068969 A1\* 2/2019 Rusanovskyy ...... H04N 19/186

FOREIGN PATENT DOCUMENTS

WO WO-2019040502 A1 2/2019

OTHER PUBLICATIONS

International Search Report and Written Opinion—PCT/US2021/027750—ISA/EPO—dated Jul. 1, 2021.

(Continued)

*Primary Examiner* — Jerry T Jean Baptiste
(74) *Attorney, Agent, or Firm* — Qualcomm Incorporated

(57) ABSTRACT

Systems and techniques are described herein for processing video data. In some examples, a process is described that can include obtaining at least one block of video data and predicting one or more video samples for the at least one block. The process can include obtaining a dynamic range adjustment (DRA) syntax element from the video data. In some cases, the DRA syntax element includes an indication associated with a plurality of DRA modes for the video data. The process can include processing the one or more video samples for the at least one block using a DRA mode based on the indication of the DRA syntax element.

30 Claims, 13 Drawing Sheets

(56) References Cited

OTHER PUBLICATIONS

Rusanovskyy (Qualcomm) D., et al., "[EVC] on HDR/WCG Support in EVC", 129, MPEG Meeting, Jan. 13, 2020-Jan. 17, 2020, Brussels, (Motion Picture Expert Group or ISO/IEC JTC1/SC29/WG11), No. m52291, m52290, Jan. 14, 2020 (Jan. 14, 2020), 317 Pages, XP030224898, Retrieved from the Internet: URL:http://phenix.int-evry.fr/mpeg/doc_end_user/documents/129_Brussels/wg11/m52291-v5-m52291_hdr_r4.zip, m52291_draftText_EVC_Study_Text_FDIS_23094-1_r1.docx [retrieved on Jan. 14, 2020] p. 66, paragraph 7.4.5.2-p. 67 p. 219, paragraph 8.9-p. 221, paragraph 8.9.7.

Rusanovskyy (Qualcomm) D., et al., "[EVC] on HLS for MPEG5 EVC", 130, MPEG Meeting, Apr. 20, 2020-Apr. 24, 2020, Alpbach, (Motion Picture Expert Group or ISO/IEC JTC1/SC29/WG11), No. m53609, Apr. 15, 2020 (Apr. 15, 2020), 342 Pages, XP030287254, Retrieved from the Internet: URL:http://phenix.int-evry.fr/mpeg/doc_end_user/documents/130_Alpbach/wg11/m53609-v1-m53609_EVC_HLS.zip m53609 spec text.docx [retrieved on Apr. 15, 2020], p. 69, paragraph 7.4.7-p. 70 p. 241, paragraph 8.9.2-p. 244, paragraph 8.9.8.

\* cited by examiner

FLEXIBLE CHROMA PROCESSING FOR DYNAMIC RANGE ADJUSTMENT

CROSS-REFERENCE TO RELATED APPLICATIONS

This application claims the benefit of U.S. Provisional Application No. 63/012,133 filed Apr. 18, 2020, which is hereby incorporated by reference for all purposes.

FIELD OF THE DISCLOSURE

The present disclosure generally relates to image and video coding, including encoding (or compression) and decoding (decompression) of images and/or video. In some examples, aspects of this application relate to signaling and operations applied to video data to improve device and system operations including compression of some types of video data (e.g., high dynamic range (HDR) and/or wide color gamut (WCG) video data).

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. As a result, the large amount of video data that is used to meet these demands places a burden on communication networks and devices that process and store the video data.

Video coding techniques may be used to compress video data. Video coding is performed according to one or more video coding standards. For example, video coding standards include versatile video coding (VVC), high-efficiency video coding (HEVC), advanced video coding (AVC), moving picture experts group (MPEG) coding, VP9, Alliance of Open Media (AOMedia) Video 1 (AV1), among others. Video coding generally utilizes prediction methods (e.g., inter-prediction, intra-prediction, or the like) that take advantage of redundancy present in video images or sequences. A goal of video coding techniques is to compress video data into a form that uses a lower bit rate, while avoiding or minimizing degradations to video quality. With ever-evolving video services becoming available, encoding techniques with better coding efficiency are needed.

SUMMARY

Systems and techniques are described for coding (e.g., encoding and/or decoding) image and/or video content. Dynamic range is the ratio between the largest and smallest values in a set of data. In video processing, data with a wide dynamic range can be processed to a narrower or alternate dynamic range that can be more easily stored and reproduced as part of Dynamic Range Adjustment (DRA). Some standards for video processing include rigid structures for managing dynamic range. Such structures in a given format can process dynamic range characteristics for luma and chroma components of video data. If an encoding and decoding system is linked to such structures, the system can be limited to processing certain formats. Aspects described herein use existing signaling and semantics of such rigid formats with limited processes, and expand the available format processing options for the system while using the existing formatting and semantics within supported signaling ranges. Such aspects can improve the performance of encoding and decoding systems and devices by enabling additional functionality without significantly impacting processing speeds or computing overhead.

In one illustrative example, certain video standards (e.g., the essential video coding (EVC) 5.0 Standard) utilize DRA with defined chroma component processing. In the case of monochrome format video data, however, the usage of chroma DRA parameters is not defined, resulting in ambiguous processing results and/or signaling of undefined data under the Standard. Additionally, some implementations (e.g., according to EVC or other Standard) specify a fixed relationship between luma and chroma scales. While such fixed relationships in coding operations allow efficient derivation of certain scales from signaled parameters, the fixed relationships may limit flexibility in processing certain video formats (e.g., red-green-blue (RGB) format data).

Aspects described herein improve system and device operation to add flexible functionality by reusing a DRA syntax element (e.g., denoted as dra_table_idx below as one illustrative example) with unused value space in available signaling structures (e.g., EVC signaling structures or signaling structures of other video coding standards, such as VVC, etc.). The DRA syntax element can include an indication of the access point to a tabulated parameter set and an indication of the plurality of DRA modes. For example, an unused value space (e.g., a $58^{th}$ space in a 0 to 58 space table which previously used values 0 through 57) can be used to store an indication associated with a plurality of DRA modes for video data. The DRA syntax element (e.g., having an assigned value from 0 through 58) can both indicate a DRA mode of a plurality of DRA modes (e.g., a joined mode for certain assigned values such as 0-57, and an independent mode for assigned value 58, in one example) while also indicating a tabulated parameter set (e.g., the assigned value of the DRA syntax element indicates the tabulated parameter set to be used in DRA processing). Such aspects can be used to signal a DRA chroma processing mode as either joint (e.g., the existing mode with a defined fixed relationship between luma and chroma scales) or independent. Based on such a technique, an independent mode can include chroma DRA parameters signaled in the video data stream, rather than chroma DRA parameters that are derived from luma parameters for the joint mode. Some examples described herein can use flags or signaling based on DRA syntax element values (e.g., values of the dra_table_idx syntax element described below) to signal a mode of multiple available modes which provide the chroma DRA parameter derivation flexibility. In some examples, aspects described herein can include constraining video bitstreams related to chroma DRA parameters as flexibility is added. Such examples can avoid coding ambiguity or signaling of undefined data associated with the flexible functionality.

According to one illustrative example, an apparatus for processing video data is provided. The apparatus comprises at least one memory and at least one processor (e.g., implemented in circuitry) coupled to the at least one memory. The at least one processor is configured to: obtain at least one block of video data; predict one or more video samples for the at least one block; obtain a dynamic range adjustment (DRA) syntax element from the video data, the DRA syntax element including an indication associated with a tabulated parameter set and a plurality of DRA modes for the video data; and process the one or more video samples for the at least one block using a DRA mode based on the indication of the DRA syntax element.

According to another illustrative example, a method of processing video data is provided. The method comprises: obtaining at least one block of video data; predicting one or more video samples for the at least one block; obtaining a dynamic range adjustment (DRA) syntax element from the video data, the DRA syntax element including an indication associated with a tabulated parameter set and a plurality of DRA modes for the video data; and processing the one or more video samples for the at least one block using a DRA mode based on the indication of the DRA syntax element.

According to another illustrative example, a non-transitory computer-readable medium is provided which has stored thereon instructions that, when executed by one or more processors, cause the one or more processors to: obtain at least one block of video data; predict one or more video samples for the at least one block; obtain a dynamic range adjustment (DRA) syntax element from the video data, the DRA syntax element including an indication associated with a tabulated parameter set and a plurality of DRA modes for the video data; and process the one or more video samples for the at least one block using a DRA mode based on the indication of the DRA syntax element.

According to another illustrative example, an apparatus for processing video data is provided. The apparatus comprises: means for obtaining at least one block of video data; means for predicting one or more video samples for the at least one block; means for obtaining a dynamic range adjustment (DRA) syntax element from the video data, the DRA syntax element including an indication associated with a tabulated parameter set and a plurality of DRA modes for the video data; and means for processing the one or more video samples for the at least one block using a DRA mode based on the indication of the DRA syntax element.

In some aspects, the method, apparatuses, and non-transitory computer-readable medium can include: applying a DRA function associated with the DRA mode to the one or more video samples, wherein luma scale information is not used to derive chroma scale parameters for the DRA function.

In some aspects, the method, apparatuses, and non-transitory computer-readable medium can include: obtaining one or more luma variables from the video data, the one or more luma variables denoting one or more luma scales for the one or more video samples.

In some aspects, the method, apparatuses, and non-transitory computer-readable medium can include: deriving a chroma scale value from the one or more luma variables for a DRA mode of the plurality of DRA modes.

In some aspects, the indication from the DRA syntax element is associated with values in a range of 0 through 58 to specify the plurality of DRA modes, the plurality of DRA modes being associated with a chroma scale derivation process.

In some aspects, a DRA mode of the plurality of DRA modes is associated with a value of 58 for the indication of the DRA syntax element, and one or more other modes of the plurality of DRA modes are associated with values of 1 through 57 for the indication of the DRA syntax element.

In some aspects, the indication of the DRA syntax element is fixed to a value of 58 when a chroma array type value associated with the DRA mode is equal to 0.

In some aspects, the method, apparatuses, and non-transitory computer-readable medium can include: determining a value of a DRA joined scale flag based on the indication associated with the plurality of DRA modes.

In some aspects, DRA scale values associated with the DRA mode are fixed with a value of 1.

In some aspects, the method, apparatuses, and non-transitory computer-readable medium can include: processing the one or more video samples using the DRA mode based on the indication of the DRA syntax element to decode the video data using the DRA mode.

According to another illustrative example, an apparatus for processing video data is provided. The apparatus comprises at least one memory and at least one processor (e.g., implemented in circuitry) coupled to the at least one memory. The at least one processor is configured to: obtain video data; generate a dynamic range adjustment (DRA) syntax element for the video data, the DRA syntax element including an indication associated with a tabulated parameter set and a plurality of DRA modes for the video data; and generate an encoded video bitstream including the DRA syntax element.

According to another illustrative example, a method of processing video data is provided. The method comprises: obtaining video data; generating a dynamic range adjustment (DRA) syntax element for the video data, the DRA syntax element including an indication associated with a tabulated parameter set and a plurality of DRA modes for the video data; and generating an encoded video bitstream including the DRA syntax element.

According to another illustrative example, a non-transitory computer-readable medium is provided which has stored thereon instructions that, when executed by one or more processors, cause the one or more processors to: obtain video data; generate a dynamic range adjustment (DRA) syntax element for the video data, the DRA syntax element including an indication associated with a tabulated parameter set and a plurality of DRA modes for the video data; and generate an encoded video bitstream including the DRA syntax element.

According to another illustrative example, an apparatus for processing video data is provided. The apparatus comprises: means for obtaining video data; means for generating a dynamic range adjustment (DRA) syntax element for the video data, the DRA syntax element including an indication associated with a tabulated parameter set and a plurality of DRA modes for the video data; and means for generating an encoded video bitstream including the DRA syntax element In some aspects, luma scale information is not used to derive chroma scale parameters for a DRA function associated with a DRA mode from the plurality of DRA modes.

In some aspects, the method, apparatuses, and non-transitory computer-readable medium can include: including one or more luma variables in the encoded video bitstream, the one or more luma variables denoting one or more luma scales for the video data using a DRA mode from the plurality of DRA modes.

In some aspects, the indication from the DRA syntax element is associated with values in a range of 0 through 58 to specify the plurality of DRA modes, the plurality of DRA modes being associated with a chroma scale derivation process.

In some aspects, a DRA mode of the plurality of DRA modes is associated with a value of 58 for the indication of the DRA syntax element, and one or more other DRA modes of the plurality of DRA modes are associated with values of 1 through 57 for the indication of the DRA syntax element.

In some aspects, the indication of the DRA syntax element is fixed to a value of 58 when a chroma array type value associated with the DRA mode is equal to 0.

In some aspects, the method, apparatuses, and non-transitory computer-readable medium can include: setting a DRA joined scale flag based on the indication associated with the plurality of DRA modes.

In some aspects, DRA scale values associated with a DRA mode from the plurality of DRA modes are fixed with a value of 1.

In some aspects, the apparatus is or is part of a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
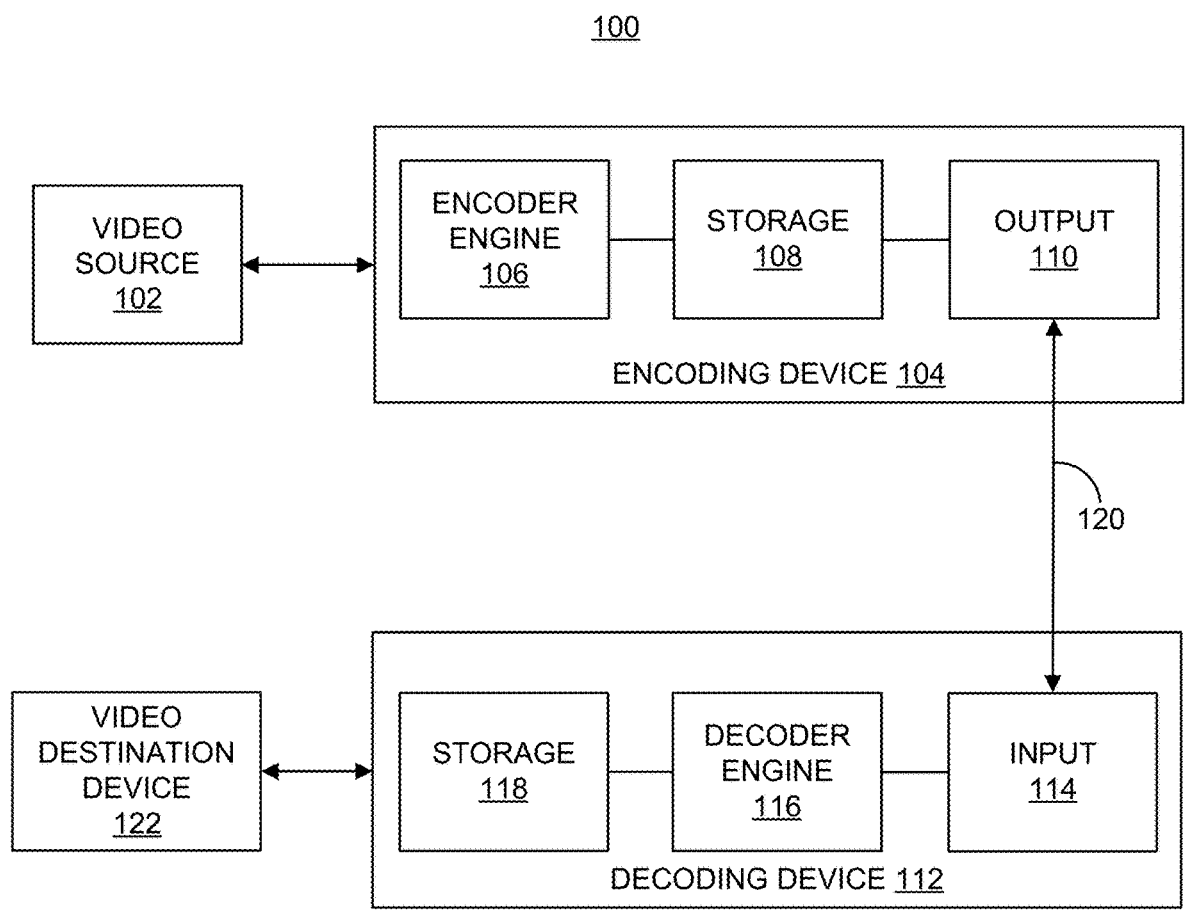
FIG. 1 is a block diagram illustrating an example of a video coding system including an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides aspects only, and is not intended to limit the scope, applicability, or configuration of the disclosure. Rather, the ensuing descriptions of various aspects will provide those skilled in the art with an enabling description for implementing an aspect. It should be understood that various changes may be made in the function and arrangement of elements without departing from the spirit and scope of the application as set forth in the appended claims.

Video coding devices implement video compression techniques to encode and decode video data efficiently. Video compression techniques include a variety of different compression and data processing options that can be applied to different streams of data having different formats. For example, dynamic range adjustment (DRA) and various prediction operations can be used in efficiently coding video data.

DRA can be used to process data with a wide dynamic range to generate data that can be more easily processed (e.g., compressed, transmitted, decoded, etc.). DRA can result in a narrower or alternate dynamic range that can be more easily stored and reproduced. Video encoding and decoding systems or devices (which can be referred to as video coding systems or devices or video codecs) use specific systems to process video data. For instance, some video coding systems use standardized operations that include rigid structures for managing dynamic range. A video coding system can use such a rigid structure in a given format to process dynamic range characteristics for luma and chroma components of video data. If a video coding system is linked to such rigid structures, the system can be limited to processing certain formats. For example, some greyscale video formats (e.g., EVC 4:0:0 format video data) do not function effectively with DRA due to the format of the data not having a relationship between luma and chroma values, which may be assumed in some video coding systems. Aspects described herein use existing signaling and semantics of such rigid systems (e.g., which can generate results, or inefficient coding with formats such as 4:0:0 greyscale format video data) to expand the available format processing options for a system, while maintaining the existing formatting and semantics within supported signaling ranges. Such aspects can improve the performance of video coding systems and devices by enabling additional functionality without significantly impacting processing speeds, compression, and computing overhead.

For example, as described above, certain video coding Standards (e.g., essential video coding (EVC) 5.0) utilize DRA with defined chroma component processing. In the case of monochrome format video data, however, the usage of chroma DRA parameters is not defined in some Standards (e.g., in the EVC 5.0 Standard), resulting in ambiguous processing results or signaling of undefined data under such Standards. Additionally, some Standard implementations (e.g., EVC) specify a fixed relationship between luma and chroma scales. Such a fixed relationship does not exist for some data formats such as the 4:0:0 greyscale format. In some cases, even when a fixed relationship is defined between luma and chroma scales, improved coding performance may be achieved without relying on such a fixed relationship between the luma and chroma scales. For instance, when data from a format (e.g., the 4:0:0 greyscale format of the EVC Standard and/or other format of the EVC or other video coding Standard) is processed, disabling chroma DRA processing can improve performance. In one example, disabling chroma DRA processing of video data including frames having a red-green-blue (RGB) format can, in some aspects, improve coding performance.

Aspects are described herein that improve system and device operation, for example by adding flexible functionality when processing video data using DRA processing. In some aspects, system and device performance is improved by reusing a DRA syntax element with unused value space (e.g., space in a data structure which is not assigned or which is unused) in available signaling structures. Such aspects can be used to signal a DRA chroma processing mode as either a joint DRA mode (e.g., with a defined fixed relationship between luma and chroma scales) or an independent DRA mode by placing an indication associated with a plurality of DRA modes in the available value space. The independent mode can include chroma DRA parameters signaled in the video data stream, rather than chroma DRA parameters that are derived from luma parameters for the joint mode. In such cases, the independent DRA mode can function to disable chroma DRA processing used with joint DRA mode operations. The joint DRA mode can also be referred to herein as a joint mode or a first mode, and the independent DRA mode can also be referred to herein as an independent mode or a second mode.

For example, in some systems, a DRA table (e.g., a quantization parameter (QP) table) structure can be used for joint mode DRA operations (which assume a fixed relationship between luma and chroma values). In some such systems (e.g., systems that utilize the EVC Standard and/or other video coding Standards), the DRA table uses a certain number element values, but has a structure available for one or more element values. In one example, the DRA syntax element can use element values 0-57, but has a structure available for a $58^{th}$ element value. According to aspects described herein, a coding device (e.g., an encoding device, decoding device, or combined encoding-decoding device or CODEC) can utilize an additional element value (e.g., the $58^{th}$ element value in the DRA syntax element that uses element values 0-57) to signal selection of a particular DRA mode. For instance, a first mode can include the joint DRA mode and a second mode can include the independent DRA mode. A video coding device can use the additional element value in the DRA syntax element (e.g., the $58^{th}$ element in the DRA syntax element) to signal the second mode (e.g., the independent DRA mode). In one illustrative example, the video coding device can use the initial element values (e.g., the 0-57 element values) of the DRA syntax element to signal the joint DRA mode. In some cases, such as when joint DRA mode is used signaled luma scale values are propagated using chroma DRA processing to derive chroma scale values, with additional processing performed to compensate for chroma shift. Continuing with the above illustrative example, the video coding device can use the additional element value (e.g., the $58^{th}$ element value) in the DRA syntax element to signal an indication associated with an additional DRA mode (e.g., the independent DRA mode) or a plurality of DRA modes, rather than signaling only the single joint DRA mode described above. In some aspects, in the independent mode (e.g., a second DRA mode in addition to the joint DRA mode described above), chroma DRA processing is disabled, and the chroma shift values can be signaled in the data stream separately from the luma values.

In some examples, a coding device that implements multiple DRA modes (e.g., a joint DRA mode and an independent DRA mode), as described above, can operate by identifying a data format, and can use the appropriate mode for the identified data format. In one illustrative example, when video data is identified as having a luma-chroma blue-chroma red (YCbCr) color space, the coding device can use the first mode (the joint mode) with joint processing and chroma DRA processing enabled. In another illustrative example, if video data having an RGB format is identified, the coding device can use the second mode (the independent mode) with chroma DRA processing disabled. By providing such mode signaling from chroma DRA processing within an existing structure (e.g., using an existing DRA syntax element), a coding device can operate with enhanced functionality and limited additional overhead, while preventing potential coding ambiguity (e.g., enhancing performance reliability) or signaling of undefined data in video data.

Such aspects can be implemented within the context of a broader coding system, which can implement additional operations for efficient management of video data, such as predictive coding, along with DRA modes and other such video coding systems.

FIG. 1 is a block diagram illustrating an example of a system 100 including an encoding device 104 and a decoding device 112. The system 100 can be used to implement DRA signaling and semantics for multiple chroma DRA processing modes as part of a complete video coding system. The encoding device 104 may be part of a source device, and the decoding device 112 may be part of a receiving device (also referred to as a client device). The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), or any other suitable electronic device.

The components of the system 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The components of system 100 can be used to implement coding operations as described above, such as DRA operations and prediction operations. different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoding device 104 can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoding device 104 can search for a block similar to the block being encoded in a frame (or picture) located in another temporal location, referred to as a reference frame or a reference picture. The video encoding device 104 may restrict the search to a certain spatial displacement from the block to be encoded. A best match may be located using a two-dimensional (2D) motion vector that includes a horizontal displacement component and a vertical displacement component. For intra-prediction modes, a video encoding device 104 may form the predicted block using spatial prediction techniques based on data from previously encoded neighboring blocks within the same picture.

The video encoding device 104 may determine a prediction error. For example, the prediction error can be determined as the difference between the pixel values in the block being encoded and the predicted block. The prediction error can also be referred to as the residual. The video encoding device 104 may also apply a transform to the prediction error using transform coding (e.g., using a form of a discrete cosine transform (DCT), a form of a discrete sine transform (DST), or other suitable transform) to generate transform coefficients. After transformation, the video encoding device 104 may quantize the transform coefficients. The quantized transform coefficients and motion vectors may be represented using syntax elements, and, along with control information, form a coded representation of a video sequence. In some instances, the video encoding device 104 may entropy code syntax elements, thereby further reducing the number of bits needed for their representation.

A video decoding device 112 may, using the syntax elements and control information discussed above, construct predictive data (e.g., a predictive block) for decoding a current frame. For example, the video decoding device 112 may add the predicted block and the compressed prediction error. The video decoding device 112 may determine the compressed prediction error by weighting the transform basis functions using the quantized coefficients. The difference between the reconstructed frame and the original frame is called reconstruction error.

The techniques described herein can be applied to any of the existing video codecs or future video coding standards (e.g., High Efficiency Video Coding (HEVC), Advanced Video Coding (AVC), MPEG5 Efficient Video Coding (EVC) (e.g., implemented in ETM5.0), Versatile Video Coding (VVC), the joint exploration model (JEM), VP9, AV1, and/or other video codecs, coding standard in development, or coding standard or codec to be developed.

While the system 100 is shown to include certain components, one of ordinary skill will appreciate that the system 100 can include more or fewer components than those shown in FIG. 1. For example, the system 100 can also include, in some instances, one or more memory devices other than the storage 108 and the storage 118 (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 1.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9 and Alliance of Open Media (AOMedia) Video 1 (AV1) are other video coding standards for which the techniques described herein can be applied.

Many embodiments described herein can be performed using video codecs such as MPEG5 EVC, VVC, HEVC, AVC, and/or extensions thereof. However, the techniques and systems described herein may also be applicable to other coding standards, such as MPEG4 or other MPEG standard, Joint Photographic Experts Group (JPEG) (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard. Additionally, as described above, aspects can be used for such video codecs to add flexibility in processing multiple formats with the context of a given video codec. Such flexibility can be associated with signaling and semantics for multiple chroma DRA processing modes, and management of constraints in data of the video data formats to prevent signaling of undefined data and coding ambiguity (e.g., unreliable coding results or outcomes).

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, So), and Scr. SL is a two-dimensional array of luma samples, So) is a two-dimensional array of Cb chrominance samples, and Scr is a two-dimensional array of Cr chrominance samples. Chrominance samples may also be referred to herein as "chroma" samples. In other instances, a picture may be monochrome and may only include an array of luma samples. A pixel can refer to a point in a picture that includes luma and chroma samples. For example, a given pixel can include a luma sample from the SL array, a Cb chrominance sample value from the Scb array, and a Cr chrominance sample value from the Scr array.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a Random Access Skipped Leading (RASL) picture flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs). As described above, in some examples, the dynamic range associated with luma samples can be directly associated with the dynamic range associated with chroma samples, and in other formats, the luma and chroma dynamic ranges are independent. Aspects described herein, such as EVC aspects, can use different modes signaled in a DRA syntax element to manage the DRA processing of samples present in a video stream of a given format. As described herein, DRA is associated with a tabulated parameter set for video processing. In accordance with aspects described herein, the DRA syntax element can include an indication of the access point to a tabulated parameter set. The DRA syntax element can, in accordance with some aspects, additionally include an indication associated with a plurality of DRA modes (e.g., indicating a current mode of available DRA modes, such as indicating a joint mode is a current mode when joint and independent modes are available.) The DRA syntax element (e.g., having an assigned value from 0 through 58, in one example) can both indicate a DRA mode of a plurality of DRA modes (e.g., a joined mode for certain assigned values such as 0-57, and an independent mode for assigned value 58, in one example) while also indicating a tabulated parameter set (e.g., the assigned value of the DRA syntax element indicates the tabulated parameter set to be used in DRA processing).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform (DCT), discrete sine transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). As previously noted, the residual data may correspond to pixel difference values between pixels of the unencoded picture and prediction values corresponding to the PUs. The encoder engine 106 may form one or more TUs including the residual data for a CU (which includes the PUs), and may then transform the TUs to produce transform coefficients for the CU. The TUs may comprise coefficients in the transform domain following application of a block transform.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), ultra-wideband (UWB), WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. Access may occur via a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

In general, a layer includes a set of VCL NAL units and a corresponding set of non-VCL NAL units. The NAL units can be assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture, resulting in all slices in a picture referring to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

Various chroma formats can be used for video. A chroma format syntax element can be used to specify chroma sampling. For instance, a syntax element chroma_format_idc specifies the chroma sampling relative to the luma sampling as specified in clause 6.2 (e.g., of the VVC standard, such as JVET-Q2001-vD). Depending on the value of chroma_format_idc, the value of the variables SubWidthC, and SubHeightC are assigned as specified in clause 6.2 and the variable ChromaArrayType is assigned. For example, the value of the variables SubWidthC, and SubHeightC can be assigned as follows in Table 1 below:

TABLE 1

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

The variables SubWidthC and SubHeightC are specified in Table 2 below, depending on the chroma format sampling structure, which is specified through chroma_format_idc. Other values of chroma_format_idc, SubWidthC and SubHeightC may be specified in the future by ISO/IEC.

TABLE 2

| chroma_format_idc | Chroma format | SubWidthC | SubHeightC |
|---|---|---|---|
| 0 | Monochrome | 1 | 1 |
| 1 | 4:2:0 | 2 | 2 |
| 2 | 4:2:2 | 2 | 1 |
| 3 | 4:4:4 | 1 | 1 |

In monochrome sampling, there is only one sample array, which is nominally considered the luma array. In 4:2:0 sampling, each of the two chroma arrays has half the height and half the width of the luma array. In 4:2:2 sampling, each of the two chroma arrays has the same height and half the width of the luma array. In 4:4:4 sampling, each of the two chroma arrays has the same height and width as the luma array.

Next generation video applications are anticipated to operate with video data representing captured scenery with high dynamic range (HDR) and wide color gamut (WCG). Parameters of the utilized dynamic range and color gamut are two independent attributes of video content, and their specification for purposes of digital television and multimedia services are defined by several international standards. For example, Recommendation ITU-R BT.709-6 (denoted as Rec.709 or BT.709) defines parameters for HDTV, such as standard dynamic range (SDR) and standard color gamut, and ITU-R Recommendation BT.2020 (denoted as Rec.2020 or BT.2020) specifies Ultra-high-definition (UHD) television parameters such as HDR and WGC. There are also other documents specifying these attributes in other systems, (e.g. P3 color gamut is defined in Society of Motion Picture and Television Engineers (SMPTE)-231-2 and some parameters of HDR are defined in SMPTE-2084 (also denoted as ST-2084).

Dynamic range can be defined as the ratio between the minimum and maximum brightness of a video signal. Dynamic range can also be measured in terms of f-stops. For instance, in cameras, an f-stop is the ratio of the focal length of a lens to the diameter of camera's aperture. One f-stop can correspond to a doubling of the dynamic range of a video signal. As an example, MPEG defines HDR content as content that features brightness variations of more than 16 f-stops. In some examples, a dynamic range between 10 to 16 f-stops is considered an intermediate dynamic range, though in other examples such a dynamic range is considered an HDR dynamic range. The human visual system is capable for perceiving much larger dynamic range, however it includes an adaptation mechanism to narrow the simultaneous range. Current video application and services are regulated by Rec.709 and provide SDR, typically supporting a range of brightness (or luminance) of around 0.1 to 100 candelas (cd) per meter squared ($m^2$) (often referred to as "nits"), leading to less than 10 f-stops. Next generation video services are expected to provide dynamic range of up-to 16 f-stops and although detailed specification is currently under development, some initial parameters of have been specified in ST-2084 and Rec.2020.

Figure 2:
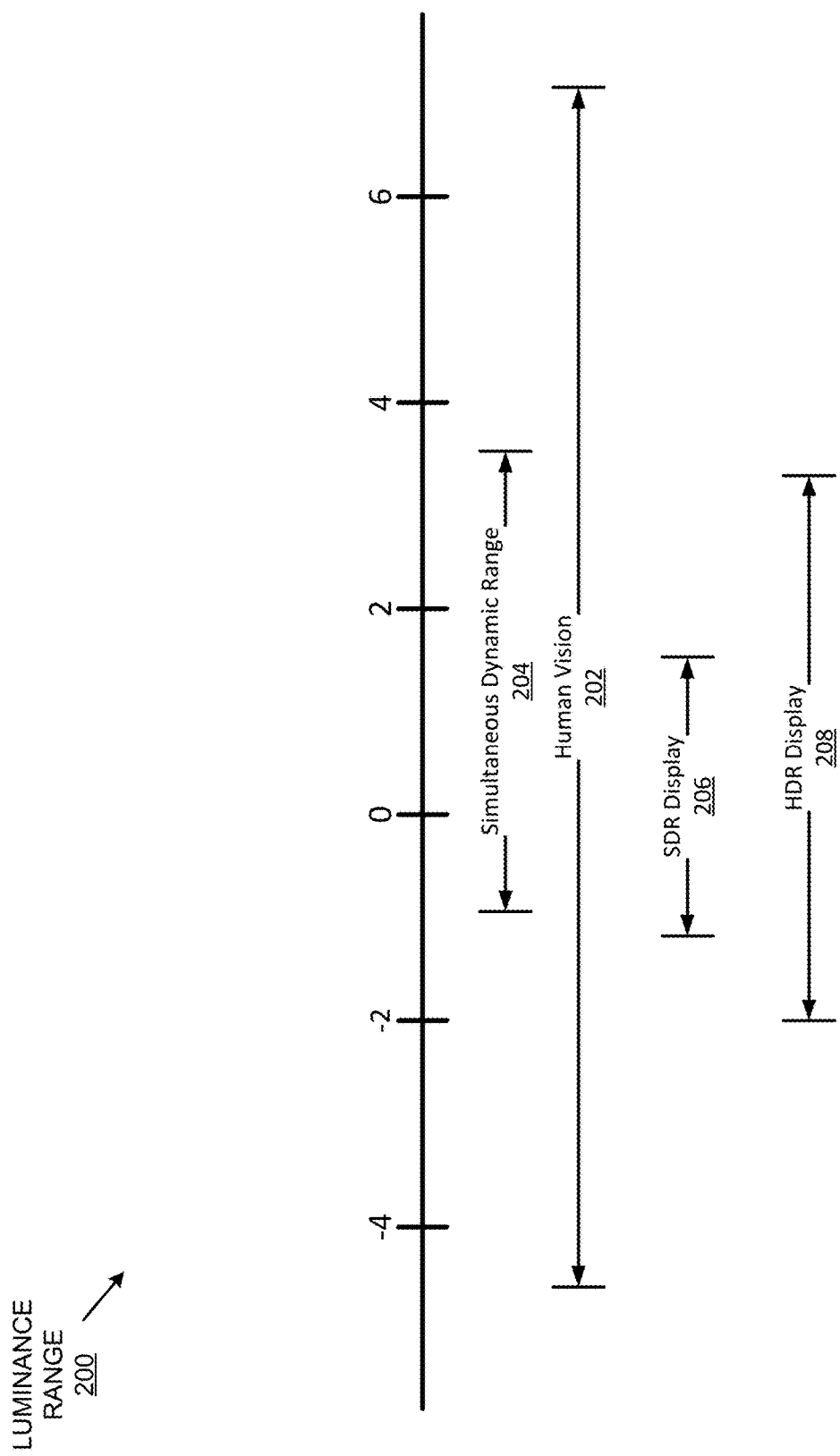
FIG. 2 is a diagram illustrating various dynamic ranges of the human vision and various display types, in accordance with some examples.

FIG. 2 illustrates the dynamic range of typical human vision 202, in comparison with the dynamic range of various display types. FIG. 2 illustrates a luminance range 200, in a nits log scale (e.g., in $cd/m^2$ logarithmic scale). By way of example, starlight is at approximately 0.0001 nits on the illustrated luminance range 200, and moonlight is at about 0.01 nits. Typical indoor light may be between 1 and 100 on the luminance range 200. Sunlight may be between 10,000 nits and 1,000,000 nits on the luminance range 200.

Human vision 202 is capable of perceiving anywhere between less than 0.0001 nits to greater than 1,000,000 nits, with the precise range varying from person to person. The dynamic range of human vision 202 includes a simultaneous dynamic range 204. The simultaneous dynamic range 204 is defined as the ratio between the highest and lowest luminance values at which objects can be detected, while the eye is at full adaption. Full adaptation occurs when the eye is at a steady state after having adjusted to a current ambient light condition or luminance level. Though the simultaneous dynamic range 204 is illustrated in the example of FIG. 2 as between about 0.1 nits and about 3200 nits, the simultaneous dynamic range 204 can be centered at other points along the luminance range 200 and the width can vary at different luminance levels. Additionally, the simultaneous dynamic range 204 can vary from one person to another.

FIG. 2 further illustrates an approximate dynamic range for SDR displays 206 and HDR display 208. SDR displays 206 include monitors, televisions, tablet screens, smart phone screens, and other display devices that are capable of displaying SDR video HDR displays 208 include, for example, ultra-high-definition televisions and other televisions and monitors.

Rec.709 provides that the dynamic range of SDR displays 206 can be about 0.1 to 100 nits, or about 10 f-stops, which is significantly less than the dynamic range of human vision 202. The dynamic range of SDR displays 206 is also less than the illustrated simultaneous dynamic range 204. Some video application and services are regulated by Rec.709 and provide SDR, typically supporting a range of brightness (or luminance) of around 0.1 to 100 nits. SDR displays 206 are also unable to accurately reproduce night time conditions (e.g., starlight, at about 0.0001 nits) or bright outdoor conditions (e.g., around 1,000,000 nits).

As noted above, next generation video services are expected to provide dynamic range of up-to 16 f-stops. HDR displays 208 can cover a wider dynamic range than can SDR displays 206. For example, HDR displays 208 may have a dynamic range of about 0.01 nits to about 5600 nits (or 16 f-stops). While HDR displays 208 also do not encompass the dynamic range of human vision, HDR displays 208 may come closer to being able to cover the simultaneous dynamic range 204 of the average person. Specifications for dynamic range parameters for HDR displays 208 can be found, for example, in Rec.2020 and ST-2084.

Figure 3:
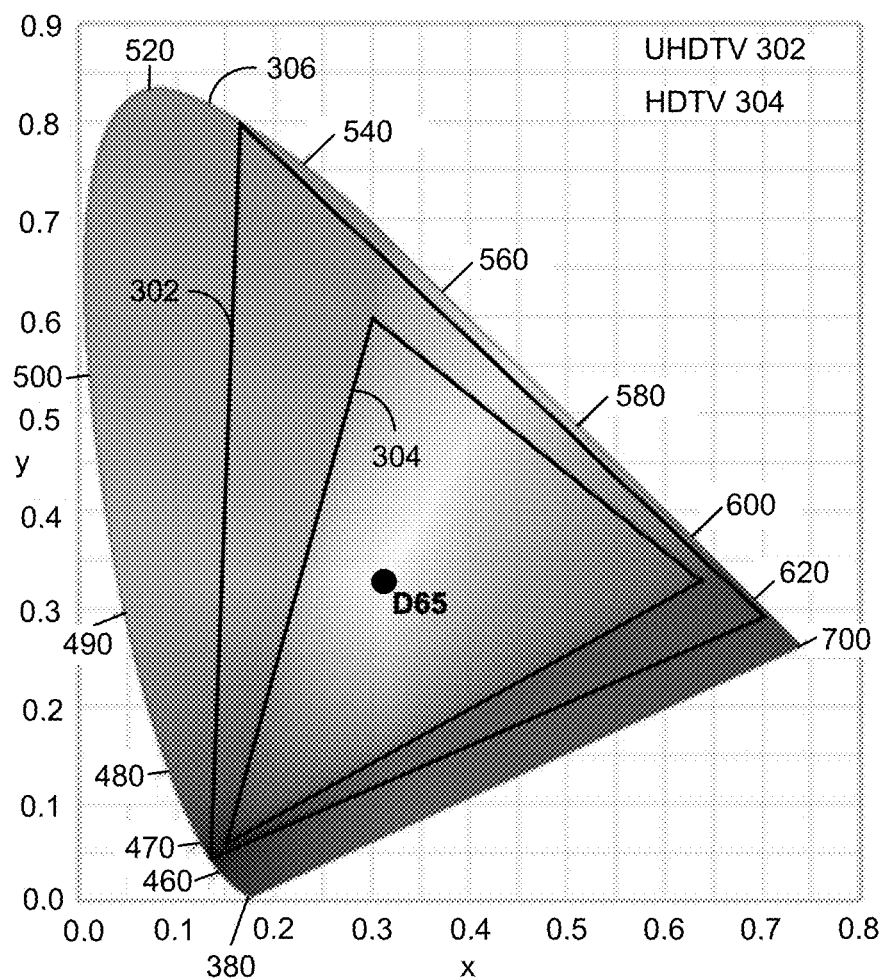
FIG. 3 is a diagram illustrating an example of a chromaticity diagram, overlaid with a triangle representing an SDR color gamut and a triangle representing a high dynamic range (HDR) color gamut, in accordance with some examples.

Color gamut describes the range of colors that are available on a particular device, such as a display or a printer. Color gamut can also be referred to as color dimension. FIG. 3 illustrates an example of a chromaticity diagram 300, overlaid with a triangle representing an SDR color gamut 304 and a triangle representing an HDR color gamut 302. Values on the curve 306 in the diagram 300 are the spectrum of colors; that is, the colors evoked by a wavelength of light in the visible spectrum. The colors below the curve 306 are non-spectral: the straight line between the lower points of the curve 306 is referred to as the line of purples, and the colors within the interior of the diagram 300 are unsaturated colors that are various mixtures of a spectral color or a purple color with white. A point labeled D65 indicates the location of white for the illustrated spectral curve 306. The curve 306 can also be referred to as the spectrum locus or spectral locus, representing limits of the natural colors.

The triangle representing an SDR color gamut 304 is based on the red, green, and blue color primaries as provided by Rec.709. The SDR color gamut 304 is the color space used by HDTVs, SDR broadcasts, and other digital media content.

The triangle representing the wide HDR color gamut 302 is based on the red, green, and blue color primaries as provided by Rec.2020. As illustrated by FIG. 3, the HDR color gamut 302 provides about 70% more colors than the SDR color gamut 304. Color gamuts defined by other standards, such as Digital Cinema Initiatives (DCI) P3 (referred to as DCI-P3) provide even more colors than the HDR color gamut 302. DCI-P3 is used for digital move projection.

Table 3 illustrates examples of colorimetry parameters for selected color spaces, including those provided by Rec.709, Rec.2020, and DCI-P3. For each color space, Table 3 below provides an x and a y coordinate for a chromaticity diagram.

TABLE 3

| Color Space | White Point | | Primary Colors | | | | | |
|---|---|---|---|---|---|---|---|---|
| | $x_w$ | $y_w$ | $x_r$ | $y_r$ | $x_g$ | $y_g$ | $x_b$ | $y_b$ |
| DCI-P3 | 0.314 | 0.351 | 0.68 | 0.32 | 0.265 | 0.69 | 0.15 | 0.06 |
| Rec.709 | 0.3127 | 0.329 | 0.64 | 0.33 | 0.3 | 0.6 | 0.15 | 0.06 |
| Rec.2020 | 0.3127 | 0.329 | 0.708 | 0.292 | 0.170 | 0.797 | 0.131 | 0.046 |

Video data with a large color volume (e.g., video data with a high dynamic range and wide color gamut) can be acquired and stored with a high degree of precision per component. For example, floating point values can be used to represent the luma and chroma values of each pixel. As a further example, 4:4:4 chroma format, where the luma, chroma-blue, and chroma-red components each have the same sample rate, may be used. The 4:4:4 notation can also be used to refer to the Red-Green-Blue (RGB) color format. As a further example, a very wide color space, such as that defined by International Commission on Illumination (CIE) 1931 XYZ, may be used. Video data represented with a high degree of precision may be nearly mathematically lossless. A high-precision representation, however, may include redundancies and may not be optimal for compression. Thus, a lower-precision format that aims to display the color volume that can be seen by the human eye is often used.

Figure 4:
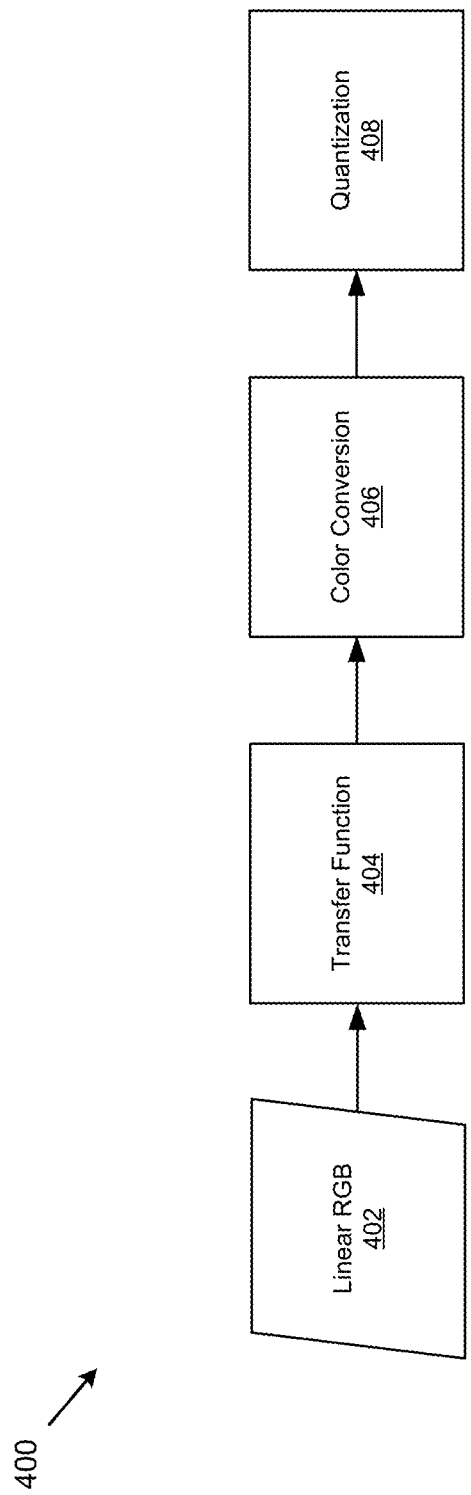
FIG. 4 is a diagram illustrating an example of a process for performing HDR/wide color gamut (WCG) representation conversion, in accordance with some examples.

FIG. 4 illustrates an example of a process 400 for performing HDR video data format conversion for purposes of compression at an encoding device (e.g., encoding device 104). The HDR data may have a lower precision and may be more easily compressed. The example process 400 includes a non-linear transfer function 404 that processes video data including linear RGB data 402. The non-linear transfer function 404 can compact the dynamic range of the linear RGB data 402. The process 400 also includes a color conversion 406 that can produce a more compact or robust color space. The process 400 further includes a quantization 408 function that can convert floating point representations to integer representations (quantization).

Figure 5:
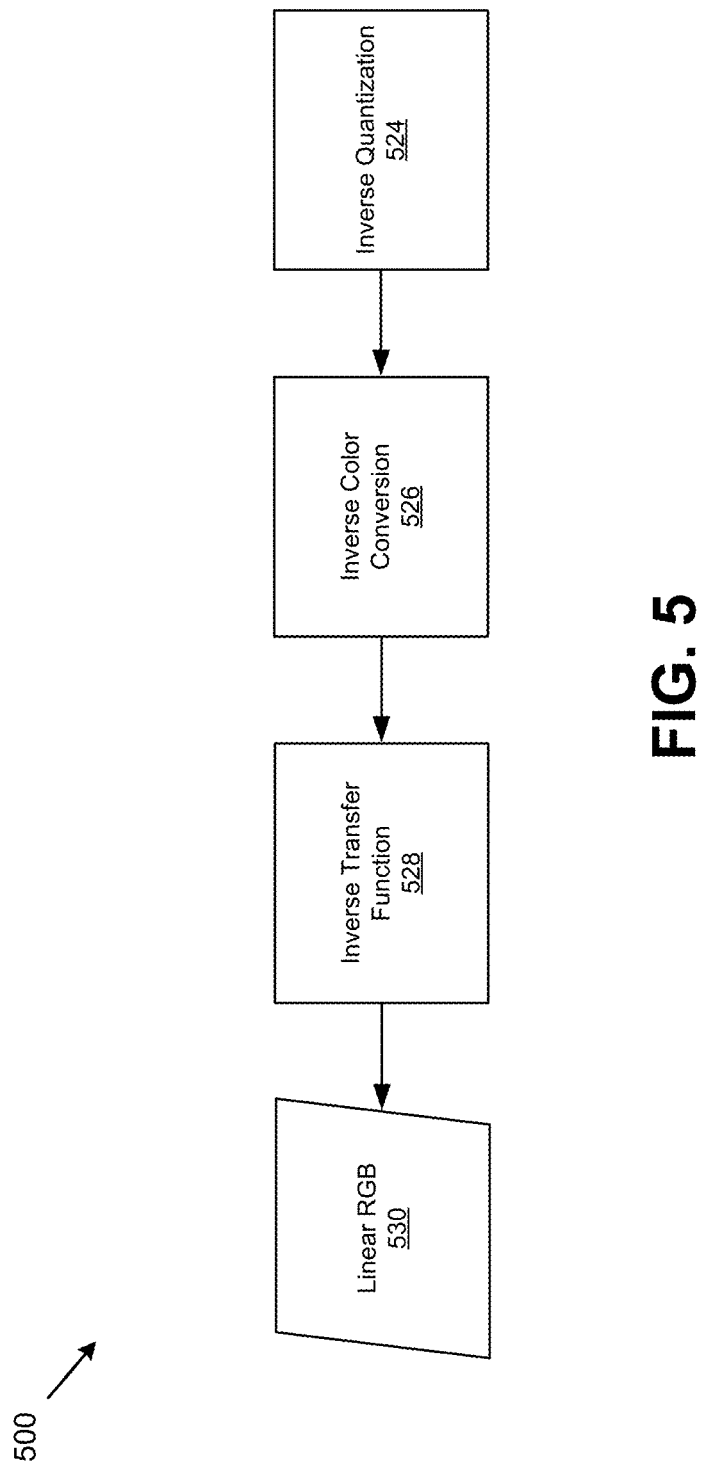
FIG. 5 is a diagram illustrating an example of a process for performing inverse HDR/WCG conversion, in accordance with some examples.

FIG. 5 illustrates an example of a process 500 for performing an inverse conversion for HDR video data by a decoding device (e.g., decoding device 112). The example process 500 performs inverse quantization 524 (e.g., for converting integer representations to floating point representations), an inverse color conversion 526, and an inverse transfer function 528 function to generate linear RGB data 530.

In various examples, the high dynamic range of input RGB data in linear and floating point representation can be compacted using the non-linear transfer function 404. An illustrative example of a non-linear transfer function 404 is the perceptual quantizer defined in ST-2084. The output of the transfer function 404 can be converted to a target color space by the color conversion 406. The target color space can be one (e.g., YCbCr) that is more suitable for compression by the encoding device. Quantization 408 can then be used to convert the data to an integer representation.

The order of the steps of the example processes 400 and 500 are illustrative examples of the order in which the steps can be performed. In other examples, the steps can occur in a different order. For example, the color conversion 406 can precede the transfer function 404. In another example, the inverse color conversion 526 can be performed after the inverse transfer function 528. In other examples, additional processing can also occur. For example, spatial subsampling may be applied to color components.

The transfer function 404 can be applied to the data in an image to compact the dynamic range of the data. Compacting the dynamic range may enable video content to represent the data with a limited number of bits. The transfer function 404 can be a one-dimensional, non-linear function that can either reflect the inverse of the electro-optical transfer function (EOTF) of an end consumer display (e.g., as specified for SDR in Rec.709), or can approximate the human visual system's perception of brightness changes (e.g., as a provided for HDR by the perceptual quantizer (PQ) transfer function specified in ST-2084 for HDR). An electro-optical transfer function (EOTF) describes how to turn digital values, referred to as code levels or code values, into visible light. For example, the EOTF can map the code levels back to luminance. The inverse process of the electro-optical transform is the optical-electro transform (OETF), which produce code levels from luminance.

Video coding methods according to standards such as MPEG and JVET (e.g., VVC, HEVC, etc.) can include dynamic range adjustment (DRA) applied to an output sample of a video coding scheme. As described above, aspects described herein can include multiple DRA modes to allow disabling of chroma DRA processing for some signals. The DRA can use parameters, such as scale and offset values, which are a function of a particular sample. By implementing the DRA, perceived distortion (e.g., in terms of signal to noise ratio) of encoded signals can be linearized within a dynamical range. In some examples, one video sample can be used to implement DRA over another video sample. For instance, decoded luma components can be used to implement DRA over chroma components. In some implementations, the DRA can be implemented as a 1 tap filter. The 1 tap filter can be a function which includes scale and offset parameters which depend on the value of an input sample. In some implementations, other filters with multiple taps can be used. An example of DRA is described in "Dynamic Range Adjustment SEI to enable High Dynamic Range video coding with Backward-Compatible Capability," D. Rusanovskyy, A. K. Ramasubramonian, D. Bugdayci, S. Lee, J. Sole, M. Karczewicz, VCEG document COM16-C 1027-E, Sep. 2015," which is hereby incorporated by reference in its entirety and for all purposes.

In some cases, DRA can be implemented as a piece-wise linear function f(x) that is defined for a group of non-overlapped dynamic range partitions (ranges) {Ri} of input value x, were i is an index of the range with range of 0 to N-1, inclusive, and where N is the total number of ranges {Ri} utilized for defining a DRA function (e.g., a chroma DRA function and/or a luma DRA function). The ranges of the DRA can be defined by minimum and a maximum x value that belong to the range Ri, e.g., [$x_i$, $x_{i+1}$−1] where $x_i$ and $x_{i+1}$ denote minimum value of the ranges $R_i$ and $R_{i+1}$ respectively. When applied to the Y color component (luma) of the video, the DRA function Sy is defined through a scale $S_{y,i}$ and offset $O_{y,i}$ which are applied to every x ∈[$x_i$, $x_{i+1}$−1], thus $S_y$={$S_{y,i}$,$O_{y,i}$}.

With the above detail, for any Ri, and every x ∈[$x_i$, $x_{i+1}$−1], the output value X is calculated as follows:

$$X = S_{y,i} * (x - O_{y,i}) \qquad \text{Equation (1)}$$

For the inverse DRA mapping process for luma component Y conducted at the decoder, DRA function Sy is defined by inverse of scale $S_{y,i}$ and offset $O_{y,i}$ values which are applied to every X ∈[$X_i$, $X_{i+1}$−1].

With the above detail, for any Ri, and every X ∈[$X_i$, $X_{i+1}$−1], reconstructed value x is calculated as follows:

$$x = X/S_{y,i} + O_{y,i} \qquad \text{Equation (2)}$$

The forward DRA mapping process for chroma components Cb and Cr were defined as following. Example is given with term "u" denoting sample of Cb color component that belongs to range Ri, u ∈[$u_i$, $u_{i+1}$−1], thus $S_u$={$S_{u,i}$, $O_{u,i}$}:

$$U = S_{u,i} * (u - O_{y,i}) + \text{Offset} \qquad \text{Equation (3)}$$

where Offset is equal to $2^{(bitdepth-1)}$ and denotes the bi-polar Cb, Cr signal offset.

The inverse DRA mapping process conducted at the decoder for chroma components Cb and Cr were defined as follows. Example is given with the U term denoting a sample of the remapped Cb color component which belongs to the range Ri, U ∈[$U_i$, $U_{i+1}$]:

$$u = (U - \text{Offset})/S_{u,i} + O_{y,i} \qquad \text{Equation (4)}$$

where Offset is equal to $2^{(bitdepth-1)}$ denotes the bi-polar Cb, Cr signal offset. In some aspects, the above DRA processes can be performed in different ways for different formats of video data. For example, in some aspects, YCbCr signals can be processed with chroma DRA processing in accordance with the above, but greyscale signals processed by the same coding device can be subject to an alternate DRA mode where chroma DRA processing is disabled.

In some aspects, Luma-Driven chroma scaling (LCS) can be performed. An example of LCS is described in JCTVC-W0101, HDR CE2: Report on CE2.a-1 LCS, A. K. Ramasubramonian, J. Sole, D. Rusanovskyy, D. Bugdayci, M. Karczewicz, which is hereby incorporated by reference in its entirety and for all purposes. In one example, a method to adjust chroma information (e.g., Cb and Cr for YCbCr format video data), can be performed by exploiting brightness information associated with the processed chroma sample. With some similarities to the DRA approach described above, parameters can be applied to a chroma sample, including a scale factor $S_u$ for Cb and $S_{y,i}$ for Cr. However, instead of defining a DRA function as piece-wise linear function $S_u$={$S_{u,i}$, $O_{u,i}$} for a set of ranges {$R_i$} accessible by chroma value u or v, the LCS approach can utilize a luma value Y to derive a scale factor for a chroma sample. With the above detail, forward LCS mapping of the chroma sample u (or v) can be conducted as:

$$U = S_{u,i}(Y) * (u - \text{Offset}) + \text{Offset} \qquad \text{Equation (5)}$$

The inverse LCS process conducted at the decoder side can be defined as follows:

$$u = (U - \text{Offset})/S_{u,i}(Y) + \text{Offset} \qquad \text{Equation (6)}$$

In some cases, for a given pixel located at (x, y), chroma samples Cb(x, y) and/or Cr(x, y) are scaled with a factor derived from its LCS function $S_{Cb}$ (and/or $S_{Cr}$) accessed by its luma value Y'(x, y).

In some examples, during the forward LCS for chroma samples, Cb (and/or Cr) values and their associated luma value Y' are taken as an input to the chroma scale function $S_{Cb}$ (or $S_{Cr}$), and Cb and/or Cr are converted into Cb' and/or Cr' as shown in Equation 7. At the decoder side, the inverse LCS is applied, reconstructed Cb' and/or Cr' are converted to Cb and/or Cr as it shown in Equation 8.

$$Cb'(x, y) = S_{Cb}(Y'(x, y)) * Cb(x, y),$$
$$Cr'(x, y) = S_{Cr}(Y'(x, y)) * Cr(x, y)$$

Equation (7)

$$Cb(x, y) = \frac{Cb'(x, y)}{S_{Cb}(Y'(x, y))}$$
$$Cr(x, y) = \frac{Cr'(x, y)}{S_{Cr}(Y'(x, y))}$$

Equation (8)

Figure 6:
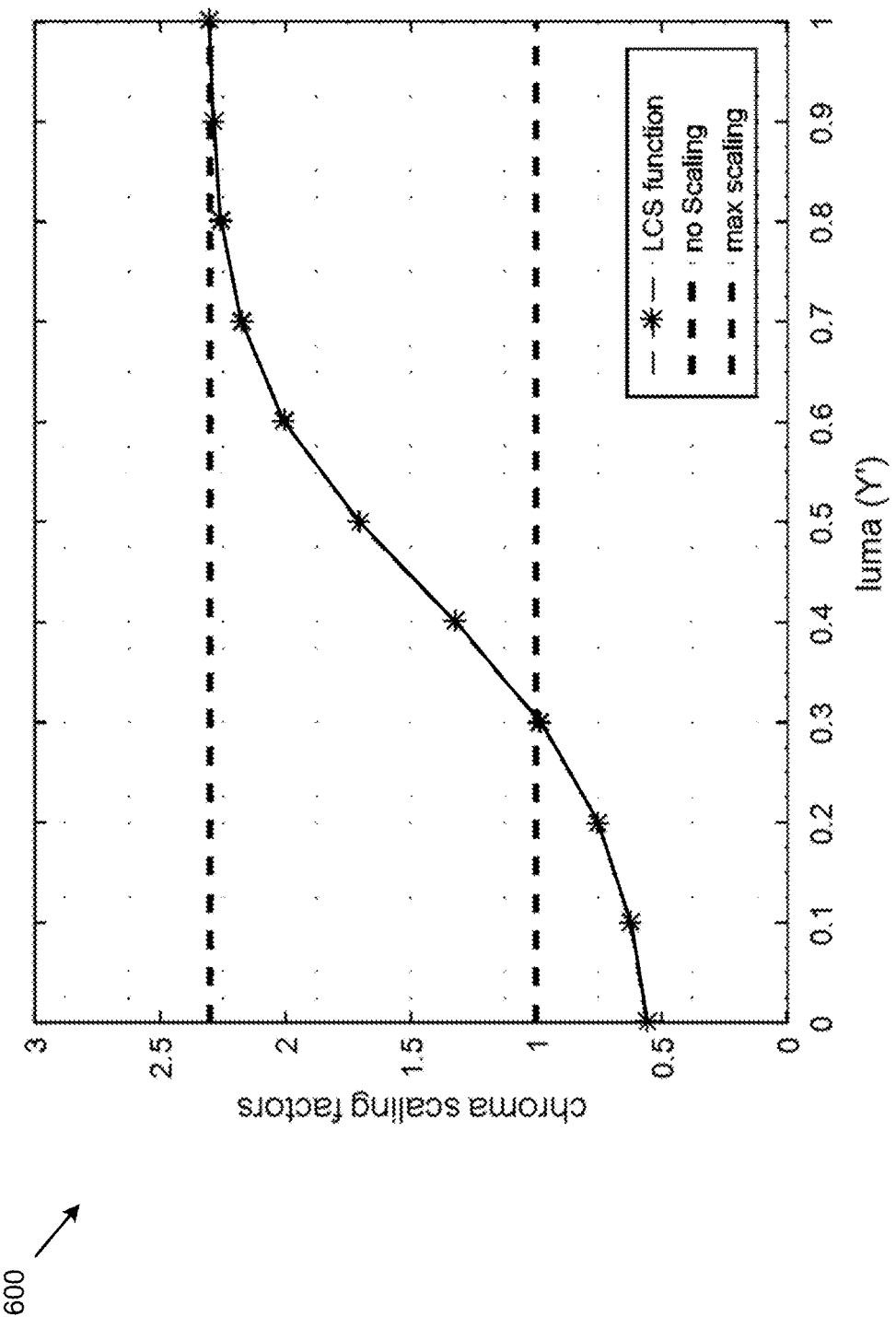
FIG. 6 is a graph illustrating an example of a Luma-Driven chroma scaling (LCS) function, in accordance with some examples.

FIG. 6 is a graph 600 illustrating an example of an LCS function. With respect to the LCS function in the example of FIG. 6, chroma components of pixels with smaller values of luma are multiplied with smaller scaling factors.

A relationship exists between DRA sample scaling functions (e.g., chroma scaling DRA functions) and Quantization Parameters of a video coding devices (e.g., an encoding device, a decoding device, or a combined video encoder-decoder device or CODEC). For example, as described above, to adjust the compression ratio at an encoder, a block transform-based video coding schemes, such as HEV C, utilize a scalar quantizer which is applied to block transform coefficients.

$$Xq = X/\text{scalerQP}$$

Equation (9)

where Xq is a quantized codevalue of the transform coefficient X produced by applying scaler scalerQP derived from QP parameter; in most codecs, the quantized codevalue would be approximated to an integer value (e.g. by rounding); in some codecs the quantization may be a different function which depends not just on the QP but also on other parameters of the codec.

Scaler value scalerQP is controlled with Quantization Parameter (QP) with the relationship between QP and scalar quantizer defined as following, where k is a known constant:

$$\text{scalerQP} = k * 2^{(QP/6)}$$

Equation (10)

The inverse function defines relationship between scalar quantizer applied to transform coefficient and QP of the HEVC as following:

$$QP = \ln(\text{scalerQP}/k) * 6/\ln(2)$$

Equation (11)

Respectively, additive change in the QP value, e.g. deltaQP, can result in multiplicative change in the scalerQP value applied to the transform coefficients.

DRA is effectively applying the scaleDRA value to the pixel sample values, and taking into consideration transform properties, which can be combined with scalerQP values as following:

$$Xq = T(\text{scaleDRA} * x)/\text{scalerQP}$$

Equation (12)

where Xq are quantized transform coefficients produced by transform T of the scaled x sample values and scaled with scalerQP applied in transform domain. Thus, applying the multiplier scaleDRA in the pixel domain results in an effective change of the scaler quantizer scalerQP, which is applied in the transform domain. The change can be interpreted in the additive change of the QP parameter applied to the current processed block of data:

$$dQP = \log 2(\text{scaleDRA}) * 6$$

Equation (13)

where dQP is an approximate QP offset introduced by HEVC by deploying DRA on the input data.

A chroma QP dependency on the Luma QP value exists in some video formats. Some of video coding designs, such as HEVC and newer designs, may utilize a pre-defined dependency between luma and chroma QP values effectively applied to process currently coded block Cb. Such a relationship between chroma and luma values may be utilized to achieve an improved bitrate allocation between luma and chroma components of a video data stream.

In other video formats (e.g., greyscale 4:0:0 format, for example) such relationships between chroma and luma values are either not present or are not helpful to improving coding performance (e.g., via bitrate allocation between luma and chroma components). Aspects described herein can enable a single coding system to have DRA modes so that some modes can use the relationships between chroma and luma values (e.g., the chroma QP dependency on Luma QP values), and at least one alternate mode that implements independent DRA for chroma and luma values.

For implementing dependent modes, an example of such dependency is represented by Table 4 below. In dependent modes, QP values applied for decoding of the chroma samples are derived from QP values utilized for decoding luma samples.

When ChromaArrayType is not equal to 0, the following applies:

The variables $qP_{Cb}$ and $qP_{Cr}$ are derived as follows:
If tu_residual_act_flag[xTbY][yTbY] is equal to 0, the following applies:

$$qPi_{Cb} = \text{Clip3}(-\text{QpBdOffset}_C, 57, Qp_y + \text{pps\_cb\_qp\_off-set} + \text{slice\_cb\_qp\_offset} + \text{Cu QpOffset}_{Cb})$$ (8-287)

$$qPi_{Cr} = \text{Clip3}(-\text{QpBdOffset}_C, 57, Qp_y + \text{pps\_cr\_qp\_off-set} + \text{slice\_cr\_qp\_offset} + \text{CuQ pOffset}_{Cr})$$ (8-288)

Otherwise (tu_residual_act_flag[xTbY][yTbY] is equal to 1), the following applies:

$$qPi_{Cb} = \text{Clip3}(-\text{QpBdOffsetC}, 57, \text{QpY} + \text{PpsActQpOff-setCb} + \text{slice\_act\_cb\_qp\_offset} + \text{CuQpOffsetCb})$$ (8-289)

$$qPi_{Cr} = \text{Clip3}(-\text{QpBdOffsetC}, 57, \text{QpY} + \text{PpsActQpOff-setCr} + \text{slice\_act\_cr\_qp\_offset} + \text{CuQpOffsetCr})$$ (8-290)

If ChromaArrayType is equal to 1, the variables $qP_{Cb}$ and $qP_{Cr}$ are set equal to the value of $Qp_C$ as specified in Table 4 based on the index qPi equal to $qPi_{Cb}$ and $qPi_{Cr}$, respectively.

Otherwise, the variables $qP_{Cb}$ and $qP_{Cr}$ are set equal to Min(qPi, 51), based on the index qPi equal to $qPi_{Cb}$ and $qPi_{Cr}$, respectively.

The chroma quantization parameters for the Cb and Cr components, $Qp'_{Cb}$ and $Qp'_{Cr}$, are derived as follows:

$$Qp'_{Cb} = qP_{Cb} + \text{QpBdOffset}_C$$ (8-291)

$$Qp'_{Cr} = qP_{Cr} + \text{QpBdOffset}_C$$ (8-292)

Table 4 illustrates QpC as a function of qPi for ChromaArrayType equal to 1.

TABLE 4

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| Qpc | =qPi | 29 | 30 | 31 | 32 | 33 | 33 | 34 | 34 | 35 | 35 | 36 | 36 | 37 | 37 | =qPi − 6 |

By leveraging such existing structures for a joint DRA mode, aspects described herein can provide flexibility for joint and independent DRA operation in the same system while limiting increased overhead. Derivation of a chroma scale for DRA is now described in some modes of a system in accordance with aspects described herein. For example, in video coding systems employing both, the uniform scalar quantization in transform domain and pixel domain scaling with DRA, derivation of the scale DRA value applied to chroma samples (Sx) can be dependent on the following:

$S_Y$: Luma scale value of the associated luma sample $S_{CX}$: Scale derived from the gamut of the content, where CX stands for Cb or Cr as applicable $S_{corr}$: correction scale term accounting for mismatch in transform coding and DRA scaling to compensate for dependencies as described above (e.g., as shown in Table 4).

$S_X = \text{fun}(S_Y, S_{CX}, S_{corr})$.

One example of the function $\text{fun}(S_Y, S_{CX}, S_{corr})$ is a separable function defined as follows: $S_X = f1(S_Y) * f2(S_{CX}) * f3(S_{corr})$.

A bumping process can be used in some cases. The decoded picture buffer maintains a set of pictures (also referred to as frames) that may be used as a reference(s) for inter-picture prediction in the coding loop of the coding device (e.g., encoding device, decoding device, or CODEC). Depending on the coding state, one or more pictures may be output for consumption by external application or read by an external application. Depending on a coding order, DPB size or other condition, a picture that has no use in the coding loop may be removed from the DPB or may be replaced by a newer reference picture in a bumping process. An example of a bumping process defined for HEVC is provided below:

C.5.2.4 "Bumping" Process

The "bumping" process consists of the following ordered steps:
1. The picture that is first for output is selected as the one having the smallest value of PicOrderCntVal of all pictures in the DPB marked as "needed for output".
2. The picture is cropped, using the conformance cropping window specified in the active SPS for the picture, the cropped picture is output, and the picture is marked as "not needed for output".
3. When the picture storage buffer that included the picture that was cropped and output contains a picture marked as "unused for reference", the picture storage buffer is emptied.
  NOTE—For any two pictures picA and picB that belong to the same CVS and are output by the "bumping process", when picA is output earlier than picB, the value of PicOrderCntVal of picA is less than the value of PicOrderCntVal of picB.

A bumping process with DRA can be performed in accordance with DRA modes implemented by various aspects described herein. DRA normative post-processing was adopted to the draft text of MPEG5 EVC specification in a form of a modified bumping process. Proposed changes to the bumping process with DRA in accordance with some aspects described herein are shown below, with changes marked in underlined text between "<highlight>" and "<highlightend>" symbols (e.g., "<highlight> highlighted text<highlightend>").

Annex C Hypothetical Reference Decoder

Figure 8:
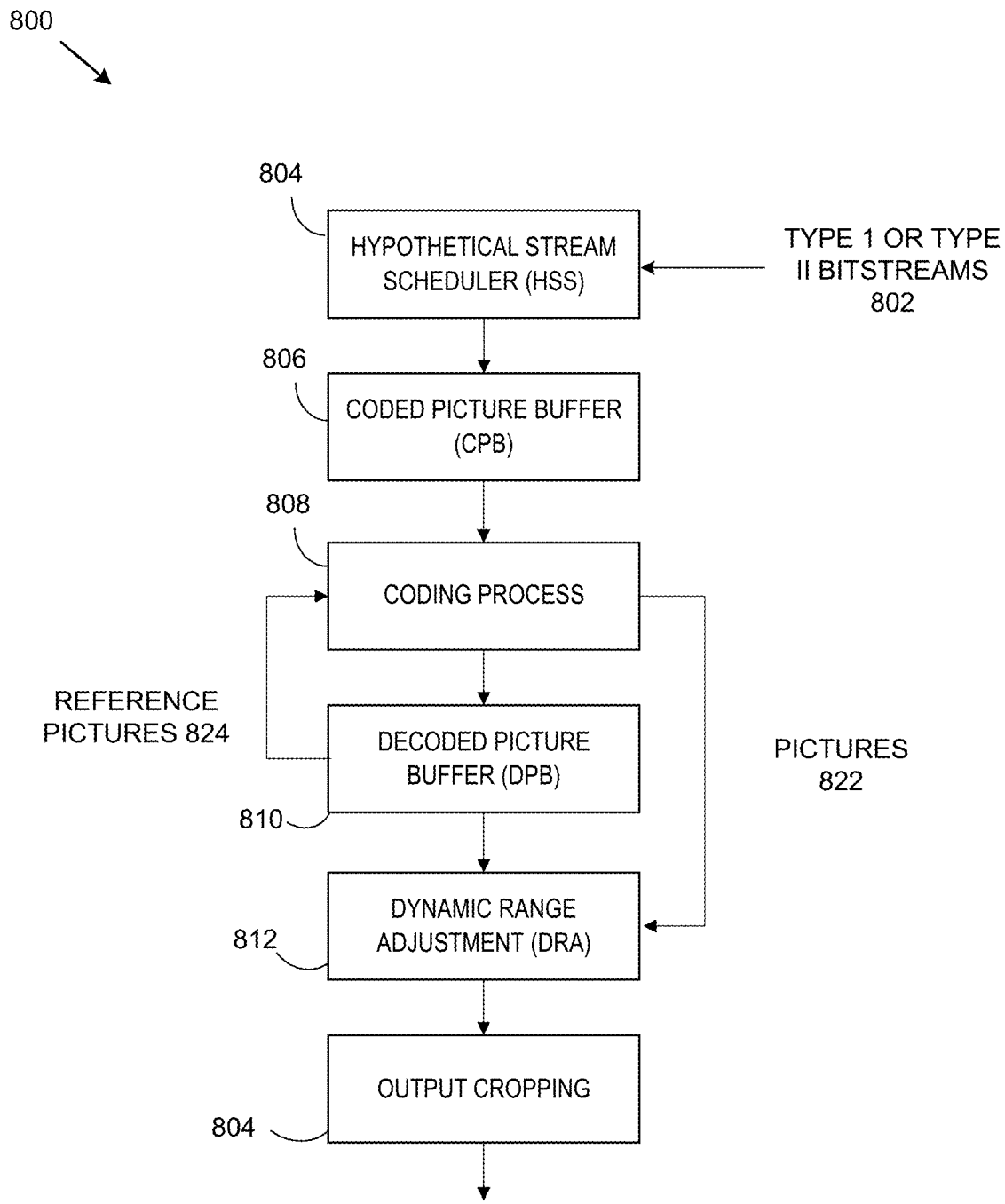
FIG. 8 is a flow diagram illustrating an example of an HDR buffer model, in accordance with some examples.

The HRD contains a coded picture buffer (CPB), an instantaneous decoding process, a decoded picture buffer (DPB), <highlight> output DRA<highlightend> (e.g., "Dynamic Range Adjustment DRA" in FIG. 8] and cropping as shown in FIG. 8).

The operation of the DPB is specified in subclause C.3. The output DRA process and cropping are specified in subclauses C.3.3 and C.5.2.4.

C.3.3 Picture Decoding and Output

Picture n is decoded and its DPB output time $t_{o,dpb}(n)$ is derived by $$t_{o,dpb}(n) = t_r(n) + t_c * \text{dpb\_output\_delay}(n) \qquad (C-12)$$

The output of the current picture is specified as follows.
  If $t_{o,dpb}(n) = t_r(n)$, the current picture is output.
  Otherwise ($t_{o,dpb}(n) > t_r(n)$), the current picture is output later and will be stored in the DPB (as specified in subclause C.2.4) and is output at time $t_{o,dpb}(n)$ unless indicated not to be output by the decoding or inference of no_output_of_prior_pics_flag equal to 1 at a time that precedes $t_{o,dpb}(n)$.

<highlight> The output picture shall be derived by invoking the DRA process specified in subclause 8.9.2 and cropped, using the cropping rectangle specified in the SPS for the sequence.<highlightend>

When picture n is a picture that is output and is not the last picture of the bitstream that is output, the value of $\Delta t_{o,dpb}(n)$ is defined as:

$$\Delta t_{o,dpb}(n) = t_{o,dpb}(n_n) - t_{o,dpb}(n) \qquad (C-13)$$

where $n_n$ indicates the picture that follows after picture n in output order.

The decoded picture is stored in the DPB.

C.5.2.4 "Bumping" Process

The "bumping" process is invoked in the following cases.
  The current picture is an IDR picture and no_output_of_prior_pics_flag is not equal to 1 and is not inferred to be equal to 1, as specified in subclause C.5.2.2.
  There is no empty picture storage buffer (i.e., DPB fullness is equal to DPB size) and an empty picture storage buffer is needed for storage of a decoded picture, as specified in subclause.

The "bumping" process consists of the following ordered steps:

<highlight>
4. The picture that is first for output is selected as the one having the smallest value of PicOrderCntVal of all pictures in the DPB marked as "needed for output". The selected picture consists of a pic width in luma samples by pic height in luma samples array of luma samples currPicL and two PicWidthInSamplesC by PicHeightInSamplesC arrays of chroma samples currPicCb and currPicCr. The sample arrays currPicL, currPicCb and currPicCr correspond to decoded sample arrays $S_L$, $S_{Cb}$ and $S_{Cr}$.

5. When dra_table_present_flag is equal to 1, DRA derivation process specified in clause 8.9 is invoked with selected picture as input and output picture as output, otherwise, the sample arrays of output picture are initialized by the sample arrays of the selected picture. <highlightend>

6. The output picture is cropped, using the conformance cropping window specified in the active SPS for the picture, the cropped picture is output, and the picture is marked as "not needed for output".

7. When the picture storage buffer that included the picture that was <highlight> mapped, <highlightend> cropped and output contains a picture marked as "unused for reference", the picture storage buffer is emptied.

In some aspects, APS signaling of DRA data can be performed. The MPEG5 EVC specification defines that DRA parameters are signalled in Adaptation Parameter Set (APS). Syntax and semantic of DRA parameters are provided below:

| seq_parameter_set_rbsp( ) { | Descriptor |
|---|---|
| ... | |
| sps_dra_flag | u(1) |
| ... | |

| pic_parameter_set_rbsp( ) { | Descriptor |
|---|---|
| ... | |
| if( sps_dra_flag ) { | |
|   pic_dra_enabled_present_flag | u(1) |
|   if( pic_dra_enabled_present_flag ) { | |
|     pic_dra_enabled_flag | u(1) |
|     if( pic_dra_enabled_flag ) | |
|       pic_dra_aps_id | u(3) |
|   } | |
| } | |
| ... | |

| adaptation_parameter_set_rbsp( ) { | Descriptor |
|---|---|
| adaptation_parameter_set_id | u(5) |
| aps_params_type | u(3) |
| if( aps_params_type = = ALF_APS ) | |
|   alf_data( ) | |
| else if( aps_params_type = = DRA_APS ) | |
|   <highlight> dra_data( ) <highlightend> | |
| aps_extension_flag | u(1) |
| if( aps_extension_flag ) | |
|   while( more_rbsp_data( ) ) | |
|     aps_extension_data_flag | u(1) |
| rbsp_trailing_bits( ) | |
| } | |

DRA Data Syntax

| dra_data( ) { | Descriptor |
|---|---|
| dra_descriptor1 | u(4) |
| dra_descriptor2 | u(4) |
| dra_number_ranges_minus1 | ue(v) |
| dra_equal_ranges_flag | u(1) |
| dra_global_offset | u(v) |
| if( dra_equal_ranges_flag ) | u(1) |
|   dra_delta_range[ 0 ] | u(v) |
| else | |
|   for( j = 0; j <= dra_number_ranges_minus1; j++) | |
|     dra_delta_range[ j ] | u(v) |
| for( j = 0; j <= dra_number_ranges_minus1; j++) | |
|   dra_scale_value[ j ] | u(v) |
| dra_cb_scale_value | u(v) |
| dra_cr_scale_value | u(v) |
| dra_table_idx | ue(v) |
| } | | sps_dra_flag equal to 1 specifies that the dynamic range adjustment mapping on output samples is used. sps_dra_flag equals to 0 specifies that dynamic range adjustment mapping on output samples is not used.

pic_dra_enabled_present_flag equal to 1 specifies that pic_dra_enabled_flag present in the PPS. pic_dra_enabled_present_flag equal to 0 specifies that pic_dra_enabled_flag is not present in the PPS. When pic_dra_enabled_present_flag is not present, it is inferred to be equal to 0.

pic_dra_enabled_flag equal to 1 specifies that DRA is enabled for all decoded picture referring to the PPS. pic_dra_enabled_flag equal to 0 specifies that DRA is note enabled for all decoded pictures referring to the PPS. When not present, pic_dra_enabled_flag is inferred to be equal to 0.

pic_dra_aps_id specifies the adaptation_parameter_set_id of the DRA APS that is enabled for decoded pictures referring to the PPS.

adaptation_parameter_set_id provides an identifier for the APS for reference by other syntax elements.

aps_params_type specifies the type of APS parameters carried in the APS as specified in Table 5.

TABLE 5

| aps_params_type | Name of aps_params_type | Type of APS parameters |
|---|---|---|
| 0 | ALF_APS | ALF parameters |
| 1 | DRA_APS | DRA parameters |
| 2 . . . 7 | Reserved | Reserved | dra_descriptor1 shall be in the range of 0 to 15, inclusive. In the current version of the specification value of syntax element dra_descriptor1 is restricted to 4, other values are reserved for future use.

dra_descriptor2 specifies the accuracy of the fractional part of the DRA scale parameters signaling and the reconstruction process. The value of dra_descriptor2 shall be in the range of 0 to 15, inclusive. In the current version of the specification value of syntax element dra_descriptor2 is restricted to 9, other values are reserved for future use.

The variable numBitsDraScale is derived as follows:

numBitsDraScale=dra_descriptor1+dra_descriptor2 dra_number_ranges_minus1 plus 1 specifies the number of ranges signalled to describe the DRA table. The value of dra_number_ranges_minus1 shall be in the range of 0 to 31, inclusive.

dra_equal_ranges_flag equal to 1 specifies that the DRA table is derived using equal-sized ranges, with size specified by the syntax element dra_delta_range[0]. dra_equal_ranges_flag equal to 0 specifies that the DRA table is derived using dra_number_ranges, with the size of each of the ranges specified by the syntax element dra_delta_range[j].

dra_global_offset specifies that the starting codeword position utilized to derive DRA table and initializes the variable inDraRange[0] as follows:

inDraRange[0]=dra_global_offset

The number of bits used to signal dra_global_offset is $BitDepth_Y$ bits.

dra_delta_range[j] specifies the size of the j-th range in codewords which is utilized to derive the DRA table. The value of dra_delta_range[j] shall be in the range of 1 to $(1<<BitDepth_Y)-1$, inclusive.

The variable inDraRange[j] for j in the range of 1 to dra_number_ranges_minus1, inclusive, are derived as follows:

inDraRange[$j$]=inDraRange[$j-1$]+(dra_equal_ranges_flag==1)?dra_delta_range[0]:dra_delta_range[$j$]

It is requirements of the bitstream conformance that inDraRange[j] shall be in the range 0 to $(1<<BitDepth_Y)-1$.

dra_scale_value[j] specifies the DRA scale value associated with j-th range of the DRA table. The number of bits used to signal dra_scale_value[j] is equal to numBitsDraScale.

dra_cb_scale_value specifies the scale value for chroma samples of Cb component utilized to derive the DRA table. The number of bits used to signal dra_cb_scale_value is equal to numBitsDraScale. In the current version of the specification value of syntax element dra_cb_scale_value shall be less than 4<<dra_descriptor2, other values are reserved for future use.

dra_cr_scale_value specifies the scale value for chroma samples of Cr component utilized to derive the DRA table. The number of bits used to signal dra_cr_scale_value is equal to numBitsDraScale bits. In the current version of the specification value of syntax element dra_cb_scale_value shall be less than 4<<dra_descriptor2, other values are reserved for future use.

The values of dra_scale_value[j], dra_cb_scale_value and dra_cr_scale_value shall not be equal to 0.

dra_table_idx specifies the access entry of the ChromaQpTable utilized to derived the chroma scale values. The value of dra_table_idx shall be in the range of 0 to 57, inclusive.

As described above, there are DRA parameters and specified DRA processing that targets chroma components processing. However, for aspects described herein with multiple DRA modes operating in the case of ChromaArrayType equal to 0 (e.g., for greyscale or monochrome video data), usage of those parameters, and applicability of the chroma sample process is not defined in some previous EVC systems.

For example, some implementations of certain video coding Standards (e.g., the EVC Standard) specify a fixed relationship between luma and chroma DRA scales derivation. Such lack of flexibility is undesirable. It would be advantageous (e.g., for increased coding efficiency, more efficient processing, etc.) for an encoding device to be able to take varying coding strategies for luma and chroma components, if needed, to process different video formats as described above. In the table below, DRA values for a DRA syntax element (e.g., dra_table_idc) are described to implement such flexibility in accordance with some aspect. In the table below, all elements of the cells below the headers "dra_data( )" and "Descriptor" are highlighted between <highlight> and <highlightend> indicators and are in underlined text.

| dra_data( ) { | Descriptor |
|---|---|
| ... | |
| ....<highlight> dra_cb_scale_value | u(v) |
| ....dra_cr_scale_value | u(v) |
| ....dra_table_idx | ue(v) |
| | <highlightend> |
| } | | dra_scale_value[j] specifies the DRA scale value associated with j-th range of the DRA table. The number of bits used to signal dra_scale_value[j] is equal to numBitsDraScale.

dra_cb_scale_value specifies the scale value for chroma samples of the Cb component utilized to derive the DRA table. The number of bits used to signal dra_cb_scale_value is equal to numBitsDraScale.

dra_cr_scale_value specifies the scale value for chroma samples of the Cr component utilized to derive the DRA table. The number of bits used to signal dra_cr_scale_value is equal to numBitsDraScale.

The values of dra_scale_value[j] for j in the range of 0 to dra_number_ranges_minus1, inclusive, dra_cb_scale_value and dra_cr_scale_value shall not be equal to 0. In the current version of the specification, the value of syntax elements dra_scale_value[j], dra_cb_scale_value and dra_cr_scale_value shall be less than 4<<dra_descriptor2. Other values are reserved for future use.

dra_table_idx specifies the access entry of the ChromaQpTable utilized to derived the chroma scale values. The value of dra_table_idx shall be in the range of 0 to 57, inclusive.

A normative chroma DRA scale derivation process specified in some versions of EVC is shown below.

Derivation of adjusted chroma DRA scales

Inputs to this process are:
  One or more variables denoting luma scales, lumaScale, chroma component index cIdx.

Output of this process are:
  One or more variables denoting chroma scales and chromaScale.

Variables scaleDra and scaleDraNorm (which can be referred to as DRA scales) are derived as follows:

scaleDra=lumaScale*((cIdx==0)?dra_cb_scale_value: dra_cr_scale_value)  (8-1228)

scaleDraNorm=(scaleDra+(1<<8))>>9  (8-1229)

The variable IndexScaleQP is derived by invoking clause 8.9.5 input value inValue set equal to scaleDraNorm, ScaleQP array and the size of the ScaleQP array, set equal to 54 as input.

The variable qpDraInt is derived as follows:

qpDraInt=2*IndexScaleQP−60  (8-1230)

The variables qpDraInt, qpDraInt and qpDraFrac are derived as follows:

tableNum=scaleDraNorm−ScaleQP[IndexScaleQP]  (8-1231)

tableDelta=ScaleQP[IndexScaleQP+1]−ScaleQP[IndexScaleQP]  (8-1232)

When tableNum is equal to 0, the variable qpDraFrac is set equal to 0, and the variable qpDraInt is decreased by 1, otherwise the variables qpDraInt, qpDraFrac and draChromaQpShift are derived as follows:

qpDraFrac=(tableNum<<10)/tableDelta  (8-1233)

qpDraInt+=(qpDraFrac>>9)  (8-1234)

qpDraFrac=(1<<9)−qpDraFrac %(1<<9)  (8-1235)

idx0=Clip3(−QpBdOffsetC,57,dra_table_idx−qpDraInt)  (8-1236)

idx1=Clip3(−QpBdOffsetC,57,dra_table_idx−qpDraInt+1)  (8-1237)

qp0=ChromaQpTable[cIdx][idx0]  (8-1238)

qp1=ChromaQpTable[cIdx][idx1]  (8-1239)

qpDraIntAdj=((qp1−qp0)*qpDraFrac)>>9  (8-1240)

qpDraFracAdj=qpDraFrac−(((qp1−qp0)*qpDraFrac)%(1<<9))  (8-1241)

draChromaQpShift=ChromaQpTable[cIdx][dra_table_idx]−qp0−qpDraIntAdj−qpDraInt  (8-1242)

When qpDraFracAdj is smaller than 0, the variables draChromaQpShift and qpDraFracAdj are derived as follows:

draChromaQpShift=draChromaQpShift−1  (8-1243)

qpDraFracAdj=(1<<9)+qpDraFracAdj  (8-1244)

The variable draChromaScaleShift is derived as follows:

idx0=Clip3(0,24,draChromaQpShift+12)  (8-1245)

idx1=Clip3(0,24,draChromaQpShift+12−1)  (8-1246)

idx2=Clip3(0,24,draChromaQpShift+12+1)  (8-1247)

draChromaScaleShift=QpScale[idx0]  (8-1248)

When draChromaQpShift is less than 0, variable draChromaScaleShiftFrac is derived as follows:

draChromaScaleShiftFrac=QpScale[idx0]−QpScale[idx1]  (8-1249)

otherwise, variable draChromaScaleShiftFrac is derived as follows:

draChromaScaleShiftFrac=QpScale[idx2]−QpScale[idx0]  (8-1250)

The variable draChromaScaleShift is modified as follows:

draChromaScaleShift=draChromaScaleShift+(draChromaScaleShiftFrac*qpDraFracAdj+(1<<8))>>9  (8-1251)

Output variable chromaScale is derived as follows:

chromaScale=(scaleDra*draChromaScaleShift)+(1<<17))>>18  (8-1252)

The entries of ScaleQP and QpScale tables are initialized as follows:

ScaleQP={0,1,1,1,1,1,2,2,3,4,4,6,7,9,11,14,18,23,29, 36,45,57,72,91,114,144,181,228, 287,362,456, 575,724,912,1149,1448,1825,2299,2896,3649, 4598,5793,7298,9195,11585,14596,18390, 23170,29193,36781,46341,58386,73562,92682, 116772}  (8-1253)

QpScale={128,144,161,181,203,228,256,287,322, 362,406,456,512,574,645,724,812,912,1024, 1149,1290,1448,1625,1825,2048}  (8-1254)

To provide flexibility instead of only providing for formats with a fixed relationship between luma and chroma DRA scales derivation, aspects described herein can signal additional syntax elements (e.g., flag values or DRA syntax element values) used to enable or disable joined luma and chroma scale derivation. In order to avoid an increase in bitrate and increase in complexity of the specification, such signaling can be integrated with existing structures as described below.

Systems, apparatuses, processes (methods), and computer-readable media (collectively referred to as "systems and techniques") are described herein that specify signaling and operations applied to video data to enable more efficient compression of some types of video data (e.g., HDR and WCG video data). In some examples, the systems and techniques described herein address implementation of the Dynamic Range Adjustment (DRA) coding tool and improve its design by removing parsing dependency and enabling support for video data with different bit depth.

In some examples, to resolve the above-identified problems (e.g., when usage of DRA parameters and applicability of the chroma sample process is not defined and/or when a fixed relationship exists between luma and chroma DRA scales derivation), various changes to the design are used in different aspects described herein.

For instance, to improve flexibility of DRA, some aspects described herein introduce use of a second operational mode (where a first operational mode is the joint DRA mode) for chroma scaling DRA functions. The chroma scaling DRA functions can be included in Standards based operation, such as EVC, VVC, HEVC, and/or other standards being developed or to be developed in the future. In one example, the second operational mode includes a chroma DRA mode without luma-chroma dependency. As described above, such a mode can be referred to as an independent DRA mode (or independent mode), where no fixed relationships between luma and chroma components or values are assumed (e.g., as opposed to the joint DRA mode where the fixed relationship between luma and chroma is assumed as part of the mode operation). In some examples, in the second operational mode (e.g., the independent mode), luma scale information, as well as QP estimates and chromaQPTable shift, are not used to derive chroma scale parameters. In some cases, the second operational mode can be considered as a mode to disable chroma DRA processing. In the second operational mode, depending on control parameters, the chroma DRA scale can be explicitly signaled in the bitstream. An example of the implementation of enabling two types of derivations is shown below, with introduced changes shown marked in underlined text in between "<highlight>" and "<highlightend>" symbols (e.g., "<highlight> highlighted<highlightend>"):

Derivation of Adjusted Chroma DRA Scales
Inputs to this process are:
  variable a denoting luma scales, lumaScale,
  chroma component index cIdx.

Output of this process are:
<highlight>
Variables denoting chroma scales and chromaScale.
When DraJoinedScaleFlag is equal to 0, output value chromaScale is derived as follows:

chromaScale = ( ( cIdx = = 0 ) ?
  dra_cb_scale_value :
  dra_cr_scale_value ) (8-1228)

Otherwise, output value chromaScale is derived as follows:
<highlightend>
Variables scaleDra and scaleDraNorm are derived as following:

scaleDra=lumaScale*((cIdx==0)?dra_cb_scale_value:
    dra_cr_scale_value) (8-1228)

scaleDraNorm=(scaleDra+(1<<8))>>9 (8-1229)

The variable IndexScaleQP is derived by invoking clause 8.9.5 for input value inValue set equal to scaleDraNorm, ScaleQP array and the size of the ScaleQP array, set equal to 54 as input.
The variable qpDraInt is derived as follows:

qpDraInt=2*IndexScaleQP−60 (8-1230)

The variables qpDraInt, qpDraInt and qpDraFrac are derived as follows:

tableNum=scaleDraNorm−ScaleQP[IndexScaleQP] (8-1231)

tableDelta=ScaleQP[IndexScaleQP+1]−ScaleQP[IndexScaleQP] (8-1232)

When tableNum is equal to 0, the variable qpDraFrac is set equal to 0, and the variable qpDraInt is decreased by 1, otherwise the variables qpDraInt, qpDraFrac and draChromaQpShift are derived as follows:

qpDraFrac=(tableNum<<10)/tableDelta (8-1233)

qpDraInt+=(qpDraFrac>>9) (8-1234)

qpDraFrac=(1<<9)−qpDraFrac %(1<<9) (8-1235)

idx0=Clip3(−QpBdOffsetC,57,dra_table_idx−qpDraInt) (8-1236)

idx1=Clip3(−QpBdOffsetC,57,dra_table_idx−qpDraInt+1) (8-1237)

qp0=ChromaQpTable[cIdx][idx0] (8-1238)

qp1=ChromaQpTable[cIdx][idx1] (8-1239)

qpDraIntAdj=((qp1−qp0)*qpDraFrac)>>9 (8-1240)

qpDraFracAdj=qpDraFrac−(((qp1−qp0)*qpDraFrac)
    %(1<<9)) (8-1241)

draChromaQpShift=ChromaQpTable[cIdx][dra_table
    idx]−qp0−qpDraIntAdj−qpDraInt (8-1242)

When qpDraFracAdj is smaller than 0, the variables draChromaQpShift and qpDraFracAdj are derived as follows:

draChromaQpShift=draChromaQpShift−1 (8-1243)

qpDraFracAdj=(1<<9)+qpDraFracAdj (8-1244)

The variable draChromaScaleShift is derived as follows:

idx0=Clip3(0,24,draChromaQpShift+12) (8-1245)

idx1=Clip3(0,24,draChromaQpShift+12−1) (8-1246)

idx2=Clip3(0,24,draChromaQpShift+12+1) (8-1247)

draChromaScaleShift=QpScale[idx0] (8-1248)

When draChromaQpShift is less than 0, variable draChromaScaleShiftFrac is derived as follows:

draChromaScaleShiftFrac=QpScale[idx0]−QpScale
    [idx1] (8-1249)

otherwise, variable draChromaScaleShiftFrac is derived as follows:

draChromaScaleShiftFrac=QpScale[idx2]−QpScale
    [idx0] (8-1250)

The variable draChromaScaleShift is modified as follows:

draChromaScaleShift=draChromaScaleShift+
    (draChromaScaleShiftFrac*qpDraFracAdj+
    (1<<8))>>9 (8-1251)

Output variable chromaScale is derived as follows:

chromaScale=(scaleDra*draChromaScaleShift)+
    (1<<17))>>18 (8-1252)

The entries of ScaleQP and QpScale tables are initialized as follows:

ScaleQP={0,1,1,1,1,1,2,2,3,4,4,6,7,9,11,14,18,23,29,
    36,45,57,72,91,114,144,181,228, 287,362,456,
    575,724,912,1149,1448,1825,2299,2896,3649,
    4598,5793, 7298,9195,11585,14596,18390,
    23170,29193,36781,46341,58386,73562, 92682,
    116772} (8-1253)

QpScale={128,144,161,181,203,228,256,287,322,
    362,406,456,512,574,645,724,812,912,1024,
    1149,1290,1448,1625,1825,2048} (8-1254)

As illustrated above, in some aspects, a DraJoinedScaleFlag can be used to indicate a DRA mode. In the above example, when the DraJoinedScaleFlag is 0, the independent DRA mode is used. In the independent mode (when the DraJoinedScaleFlag is 0), a chromaScale value is determined using a variable cIdx specifying the color components of the current coding block, along with the scale values for chroma samples derived from the DRA syntax element (e.g., dra_cr_scale value and dra_cb_scale value derived based on a DRA mode). If the DraJoinedScaleFlag is not 0 (e.g., includes a value of 1), the joint DRA mode (e.g., based on deriving the chromaScale value from a fixed chroma/luma relationship) is used. The DraJoinedScaleFlag can be used to indicate that DRA lama scaling values are not propagated to DRA chroma scaling values, and chroma scale parameters are initialized using only chroma processing (e.g., using dra_cb_scale_value and dra_cr_scale_value).

In accordance with some aspects, systems and techniques are described for reusing a DRA syntax element (e.g., dra_table_idx syntax element structures) to signal a mode of DRA chroma processing. According to existing video coding Standards, the DRA syntax element (e.g., dra_table_idx) is used to access entries of chromaQP offset table of EVC (e.g., using an initial set of 57 values in the data space of the DRA table). According to aspects described herein, to enable two operational modes of chroma DRA processing, functionality of the DRA syntax element (e.g., dra_table_idx) is enhanced by using a syntax element or variable (e.g., a flag) specifying the type of chroma DRA scale derivation (e.g., using a previously unused 58$^{th}$ value in the data space of the DRA syntax element). In some aspects, the syntax element or variable (e.g., the flag) is implemented by extending the legal range of the dra_table_idx from 0 . . . 57, inclusive, to 0 . . . 58, inclusive. In some such aspects, the value dra_table_idx equal to 58 is not used to access the chroma DRA syntax element, and instead specifies that a specific DRA mode (e.g., independent DRA mode) is used or is to be used. For instance, an dra_table_idx value equal to 58 can specify that joined luma-chroma derivation process (the joint DRA mode) for chroma DRA scales is disabled, and that chroma DRA scale is derived independently (using the independent DRA mode).

An example of an implementation with an expanded DRA syntax element to implement a flag is shown below, with introduced changes shown marked in underlined text in between "<highlight>" and "<highlightend>" symbols (e.g., "<highlight> highlighted text <highlightend>"):
dra_table_idx specifies <highlight> the mode of the chroma scale derivation process, and when it is applicable <highlightend>, dra_table_idx is less or equal to 57, the access entry of the ChromaQpTable utilized to derived the chroma scale values. The value of dra_table_idx shall be in the range of 0 to <highlight><highlightend>, inclusive.
<highlight> When dra_table_idx is equal to 58, the variable DraJoinedScaleFlag is set equal to 0, otherwise it is set equal to 1. <highlightend>

As described above, aspects according to the dra_table_idx use dra_table_idx values less than or equal to 57 to indicate a first mode of DRA operation (e.g., the joint DRA mode). An dra_table_idx value of 58 (e.g., an available but previously unused value in the available data space for the DRA syntax element) indicates a second mode of DRA operation (e.g., the independent DRA mode). In some aspects, the value of the DRA syntax element can be set based on encoder analysis of a data format to be encoded. When a data format is identified where disabling chroma DRA operations is associated with improved performance (e.g., EVC 4:0:0 greyscale formats), the dra_table_idx can be set to 58 by an encoding device, indicating that the independent DRA mode is used or is to be used (e.g., by a decoding device and/or media player device).

In another example, systems and techniques are described for providing bitstream constraints on chroma DRA parameters. For example, to avoid signaling of un-defined information not affecting the decoding process, the following constraints can be used in some aspects. Introduced changes are shown marked in underlined text in between "<highlight>" and "<highlightend>" symbols (e.g., "<highlight> highlighted text <highlightend>"):

| | |
|---|---|
| dra_cb_scale_value | u(v) |
| dra_cr_scale_value | u(v) |
| dra_table_idx | ue(v) | dra_cb_scale_value specifies the scale value for chroma samples of the Cb component utilized to derive the DRA table. The number of bits used to signal dra_cb_scale_value is equal to numBitsDraScale.
dra_cr_scale_value specifies the scale value for chroma samples of the Cr component utilized to derive the DRA table. The number of bits used to signal dra_cr_scale_value is equal to numBitsDraScale.
The values of dra_scale_value[j] for j in the range of 0 to dra_number_ranges_minus1, inclusive, dra_cb_scale_value and dra_cr_scale_value shall not be equal to 0. In the current version of the specification, the value of syntax elements dra_scale_value[j], dra_cb_scale_value and dra_cr_scale_value shall be less than 4<<dra_descriptor2. Other values are reserved for future use. <highlight> When ChromaArrayType is equal to 0, it is a requirement of the bitstream conforming to this document, that values dra_cb_scale_value and dra_cr_scale_value shall be equal to 1. <highlightend>
dra_table_idx specifies the mode the chroma scale derivation process, and when it is applicable, dra_table_idx is less or equal to 57, the access entry of the ChromaQpTable utilized to derived the chroma scale values. The value of dra_table_idx shall be in the range of 0 to 58, inclusive.
<highlight> When ChromaArrayType is equal to 0, it is a requirement of the bitstream conforming to this document, that values dra_table_idx shall be equal to 58. <highlightend>
When dra_table_idx is equal to 58, the variable DraJoinedScaleFlag is set equal to 0, otherwise it is set equal to 1.

In some examples, a ChromaArrayType variable with a value equal to 0 indicates a chroma format 4:0:0 (e.g., corresponding to a monochrome format). In some such examples, when ChromaArrayType is equal to 0, values of dra_cb_scale_value and dra_cr_scale_value can be fixed to be equal to 1, to define decoder behavior for certain chroma formats (e.g., chroma format 4:0:0) and can allow for uniform decoder behavior. In some examples, it can be a requirement of a bitstream that conforms to a particular video coding standard (e.g., VVC, HEVC, EVC, AV1, etc.) that values of dra_cb_scale_value and dra_cr_scale_value shall be fixed to be equal to 1. In some such examples where ChromaArrayType indicates a monochrome format (e.g., when ChromaArrayType is equal to 0), values of dra_table_idx can be fixed to be equal to 58. In some examples, it can be a requirement of a bitstream that conforms to a particular video coding standard (e.g., VVC, HEVC, EVC, AV1, etc.) that, when ChromaArrayType indicates a monochrome format (e.g., when ChromaArrayType is equal to 0), values of dra_table_idx shall be fixed to be equal to 58. In some such examples, the fixed dra_table_idx value relates to the aspects described above where the 58$^{th}$ element in the DRA syntax element is used to signal the independent DRA mode for certain formats (e.g., for the chroma format 4:0:0). In some cases, the ChromaArrayType variable can be referred to as a chroma array type value.

Figure 7:
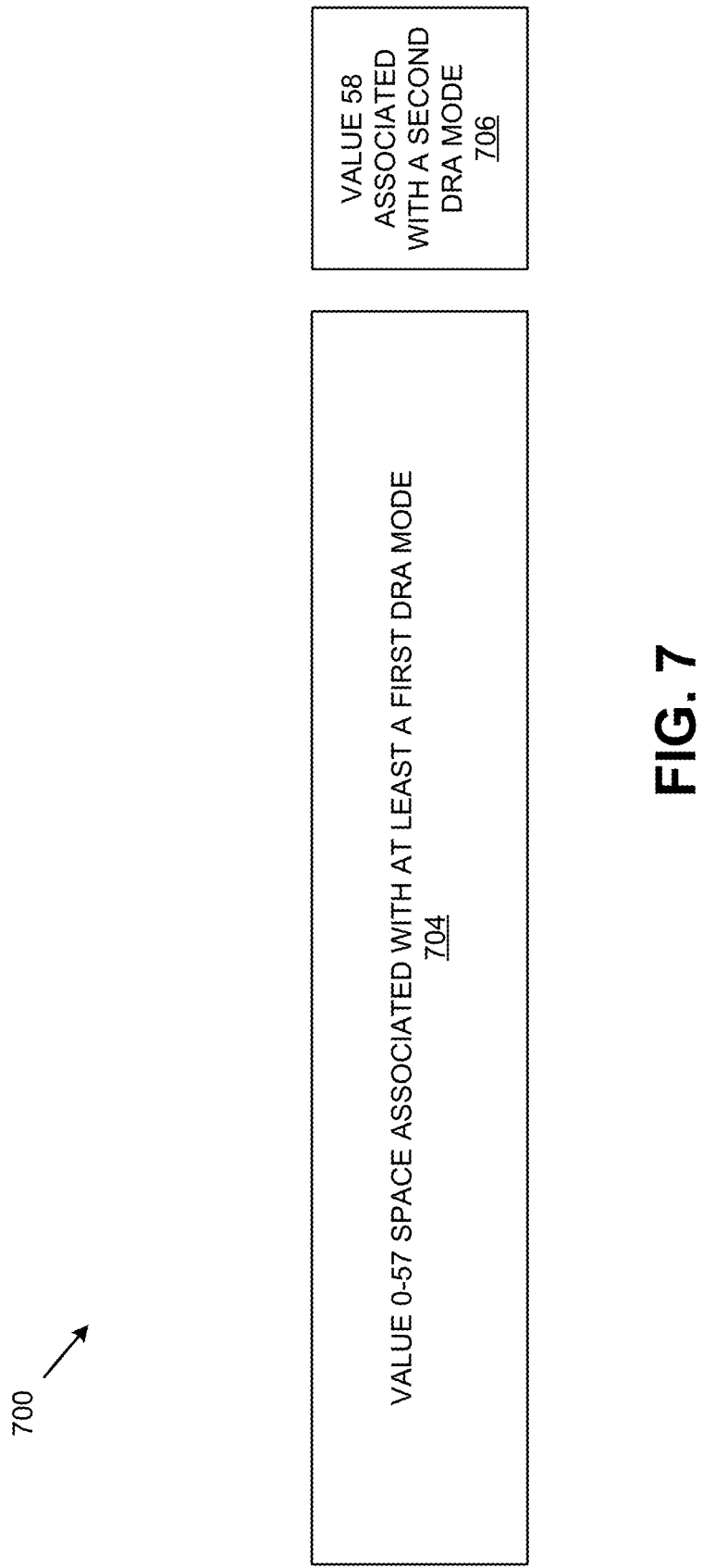
FIG. 7 illustrates aspects of a DRA syntax element for indicating a DRA mode in accordance with some examples.

FIG. 7 illustrates aspects of a DRA syntax element 700 for indicating a DRA mode in accordance with some examples. As described above, the syntax element dra_table_idx can be used to specify the mode of the chroma scale derivation process. The dra_table_idx indicates the mode using the associated values from a value space from 0 through 58. As described above, some Standard coding systems (e.g., EVC) can use a value space 704 of 0 through 57 to indicate the access entry of the ChromaQpTable utilized to derive chroma scale values. The data element representing the value from this value space (e.g., a particular value such as 53 for a particular implementation) is capable of representing an additional value 706 (e.g., a larger value space), and so aspects herein extend the value space from 0 through 57 to 0 through 58. The value 58 can then be associated with a second DRA mode.

In aspects according to the above, data constraints such as requiring dra_cb_scale value and dra_cr_scale_value be equal to one when ChromaArrayType is equal to 0 prevents ambiguity in signaling, and possible errors (e.g., since a ChromaArrayType value of 0 is incompatible with values of the chroma scale values other than one). Similarly, forcing a DraJoinedScaleFlag value of 0 when dra_table_idx is 58 avoids ambiguity and possible errors, since the other values for dra_table_idx (e.g., 57 and below) are incompatible with the mode set by any value other than a DraJoinedScaleFlag value of 0. To avoid errors, scale values are constrained when this data format is identified, and the dra_table_idx value is fixed to 58. Constraining data values for such a format prevents ambiguity or errors that may occur if values for another mode (e.g., dra_table_idx values of 57 or lower) are used for an incompatible mode.

In one example implementation, an encoder operating according to the syntax above can receive greyscale formatted data (e.g., EVC 4:0:0 format data), and set a ChromaArrayType value to 0 based on identifying the data is in this format.

FIG. 8 is a flow diagram illustrating an example of a hypothetical reference decoder (HRD) buffer model 800, in accordance with some examples. In some aspects, a reference decoder in accordance with the HRD model of FIG. 8 and can implement the above describe DRA functionality with multiple chroma DRA processing modes.

The HRD buffer model receives a bitstream of video data. In accordance with aspects described herein, the HRD buffer model 800 or a device (e.g., an encoder or decoder) implementing HRD buffer model 800 can classify an incoming datastream based on a chroma DRA processing mode or type. The datastream type (e.g., format) is accepted, and can be classified by an initial operation as a chroma DRA type (e.g., joint or independent) and the DRA operations 812 will proceed based on the format of the incoming bitstream 802.

Prior to DRA operations 812, hypothetical stream scheduler (HSS) operations 804 perform coding scheduling, and coded picture buffer (CPB) 806 organizes stream data in accordance with details described above. Decoding process 808 then performs decoding using feedback data from reference pictures 824 which are stored in decoded picture buffer (DPB) 810. Output pixel data (e.g., video bitstream data) from decoding process 808 is also provided to DRA operations 812 as pictures 822 (e.g., output pixel data). As part of a previous operation (e.g., from HSS 804), the DRA operations 812 are informed of a chroma DRA processing mode based on the bitstream 802 format. The chroma DRA processing mode can be associated with an indicator such as a flag or a value from a DRA syntax element, as described above. After the DRA operations 812 are performed, output cropping 804 processes the output data stream to create the output video data that can be transmitted, stored, or displayed. Processing the indication of the video data format type or a chroma DRA processing type (e.g., an indication associated with a plurality of DRA modes) from bitstream 802 allows the DRA operations 812 to support multiple modes. By providing syntax structures for the multiple modes within existing syntax structures of coding standards such as EVC, flexibility for processing additional video format types is provided with limited additional overhead (e.g., limited impact on bitrate). Such a HRD buffer model 800 can be used in coding device implementations to improve the video coding system and devices within the system as described above.

Figure 9:
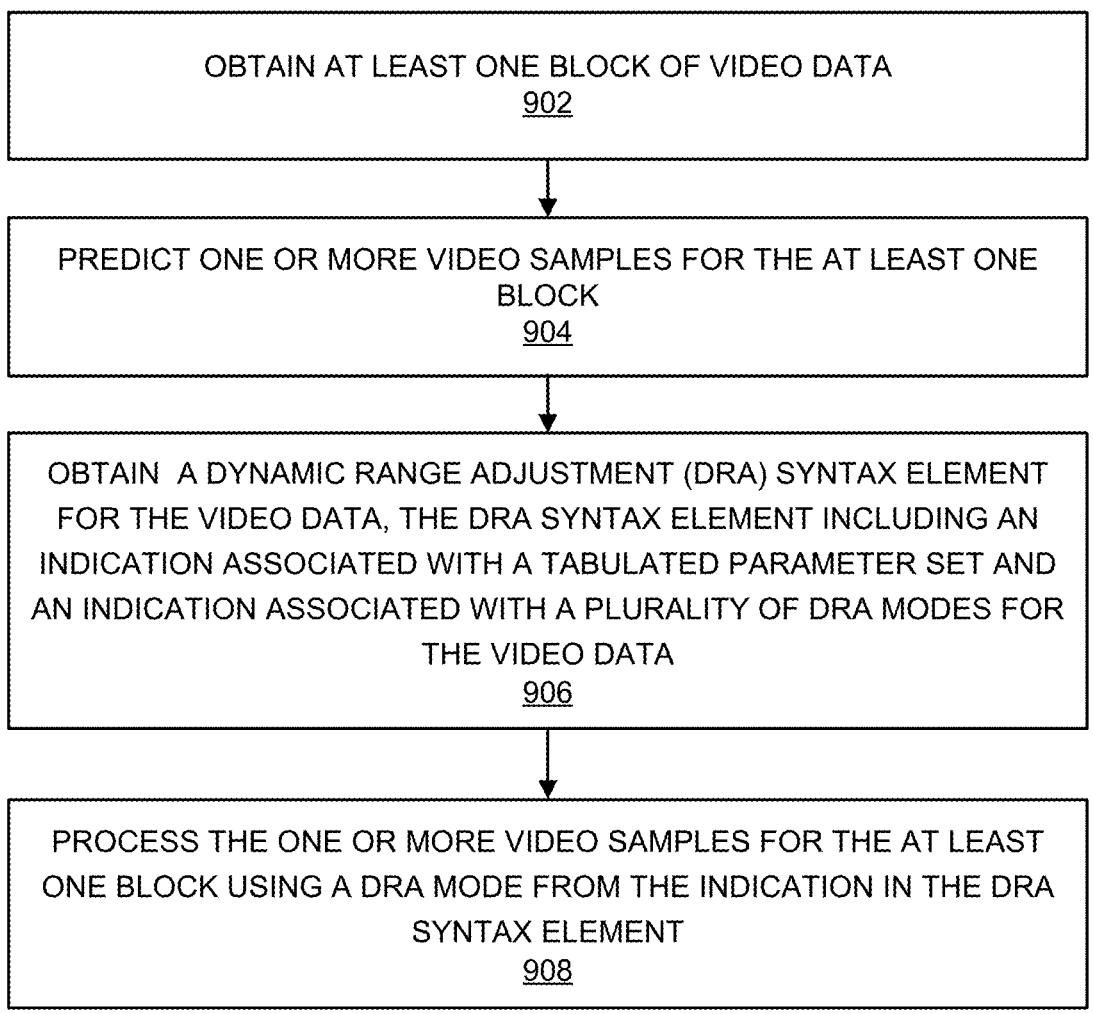
FIG. 9 is a flow diagram illustrating an example of a process of processing video data, in accordance with some examples.

FIG. 9 is a diagram illustrating an example of a process 900 of processing video data, in accordance with some examples. In some aspects, the process 900 is performed by a decoding device (e.g., the decoding device 112 of FIG. 1). In some aspects, the process 900 is implemented in a system with a memory and one or more processors configured to perform the operations of the process 900. In some aspects, the process 900 is implemented in instructions stored in a computer readable storage medium. The instructions, when processed by one or more processors of a coding device (e.g., the decoding device 112), cause the apparatus to perform the operations of the process 900. In other aspects, other implementations are possible in accordance with the details provided herein.

At block 902, process 900 includes obtaining at least a block of video data. As described above, the at least one block of video data can be part of a picture from a set of encoded pictures (or images or frames) that are being decoded in accordance with a video coding standard (e.g., VVC, EVC, etc.) as described herein. At block 904, process 900 includes predicting one or more video samples for the at least one block. The prediction operations can include any prediction operations described above for predictive video coding operations, such as intra-prediction, inter-prediction, etc.

At block 906, the process 900 includes obtaining a DRA syntax element (e.g., dra_table_idx) from the video data. The DRA syntax element includes an indication (e.g., a value) associated with a DRA mode for the video data from among a plurality of DRA modes available for the video data. For example, as described above, some examples can have a type 1 DRA mode for DRA configurations where chroma scales are derived from luma scales. Some such examples can also have a type 2 DRA mode for DRA configurations where chroma scales are signaled independently from luma scales (e.g., for monochrome video data). In other examples, other combinations of modes are possible.

At block 908, the process 900 includes processing the video data using a DRA mode indicated by the DRA syntax element. For instance, the process 900 can include processing the one or more video samples using the DRA mode based on the indication of the DRA syntax element to decode the video data using the DRA mode. In some examples, to process the video data using the DRA mode, the process 900 can include applying a DRA function associated with the DRA mode to the one or more video samples. In such examples, luma scale information is not used to derive chroma scale parameters for the DRA function, as described above.

In some examples, the process 900 can include obtaining one or more luma variables from the video data. The one or more luma variables denote or specify one or more luma scales for the one or more video samples using the DRA mode. In one illustrative example, the one or more luma variables include the lumaScale variable denoted above that denotes the luma scales of the video data. In some examples, the process 900 can include deriving a chroma scale value (e.g., for the chromaScale variable) from the one or more luma variables for a DRA mode of the plurality of DRA modes.

In some cases, the indication from the DRA syntax element is associated with values in a range of 0 through 58 to specify the plurality of DRA modes. The plurality of DRA modes can be associated with a chroma scale derivation process. In some aspects, a DRA mode of the plurality of DRA modes is associated with a value of 58 for the indication of the DRA syntax element. In such aspects, one or more other modes of the plurality of DRA modes are associated with values of 1 through 57 for the indication of the DRA syntax element. In some cases, the indication of the DRA syntax element is fixed to a value of 58 when a chroma array type value associated with the DRA mode is equal to 0. In one illustrative example, as described above, a dra_table_idx value of 58 (e.g., an indication included in the DRA syntax element) is associated with a DRA mode for independent chroma signaling. In other examples, other dra_table_idx values can indicate other DRA modes or any given value can be associated with any DRA mode supported by a particular coding system.

In some examples, the process 900 can include determining a value of a DRA joined scale flag based on the indication associated with the plurality of DRA modes. In one illustrative example, the DRA joined scale flag includes the DraJoinedScaleFlag variable discussed above. In some cases, DRA scale values associated with the DRA mode are fixed with a value of 1.

Figure 10:
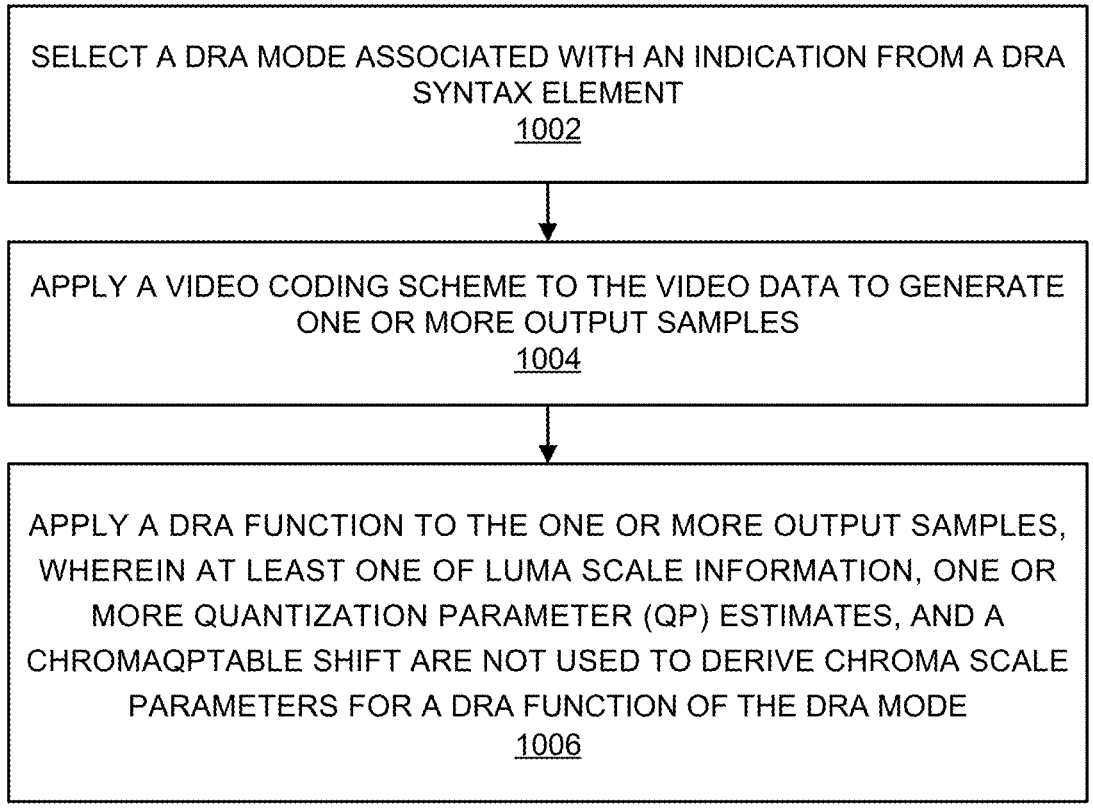
FIG. 10 is a flow diagram illustrating an example of a process of processing video data, in accordance with some examples.

FIG. 10 is a flow diagram illustrating example operations of block 908 of process 900. As described above, block 908 includes processing video data using a DRA mode as indicated in a DRA syntax element (e.g., dra_table_idx). The preceding operations of process 900 can be considered as block 1002 to identify and select a DRA mode from among a plurality of available DRA modes using an indication from a DRA syntax element.

After identification and selection of a DRA mode associated with the indication from the DRA syntax element occurs at block 1002 (e.g., occurring prior to block 908 in process 900), the process can include, at block 908, multiple operations to process video data using the DRA mode.

In block 1004, a video coding scheme is applied to the video data to generate one or more output samples. In some examples, block 1004 can be associated with the operations of process 808, which applies a coding process to video data (e.g., a type 1 bitstream or a type 2 bitstream associated with a first DRA mode (type 1) where a chroma scale is derived from a luma scale or a second DRA mode (type 2) where a chroma scale is signaled independently). Based on applying the coding process, the process generates one or more output samples, which can be stored in a decoded picture buffer (e.g., DPB 810).

At block 1006, a DRA function is applied to the one or more output samples. For a first DRA mode associated with a type 1 bitstream, a first DRA function can be applied. For a second DRA mode associated with a type 2 bitstream, a second DRA function can be applied. In one example, the first DRA mode is a joint DRA mode as described above, with a standard bitstream of video data where a fixed relationship between chroma and luma values is assumed, and the DRA function can derive chroma scale parameters from luma scale parameters. In some examples, the second DRA mode is an independent DRA mode as described herein, with processes to derive DRA chroma scaling values from DRA luma scaling values disabled. In some such examples, the DRA function associated with the second DRA mode operates such that at least one of luma scale information, one or more QP estimates, and a chromaQPTable shift are not used to derive chroma scale parameters. As described, in some such examples, a type 2 bitstream associated with such a DRA function can be a greyscale format bitstream (e.g., EVC 4:0:0 format video data). In other examples, additional modes and DRA functions can be used.

Figure 11:
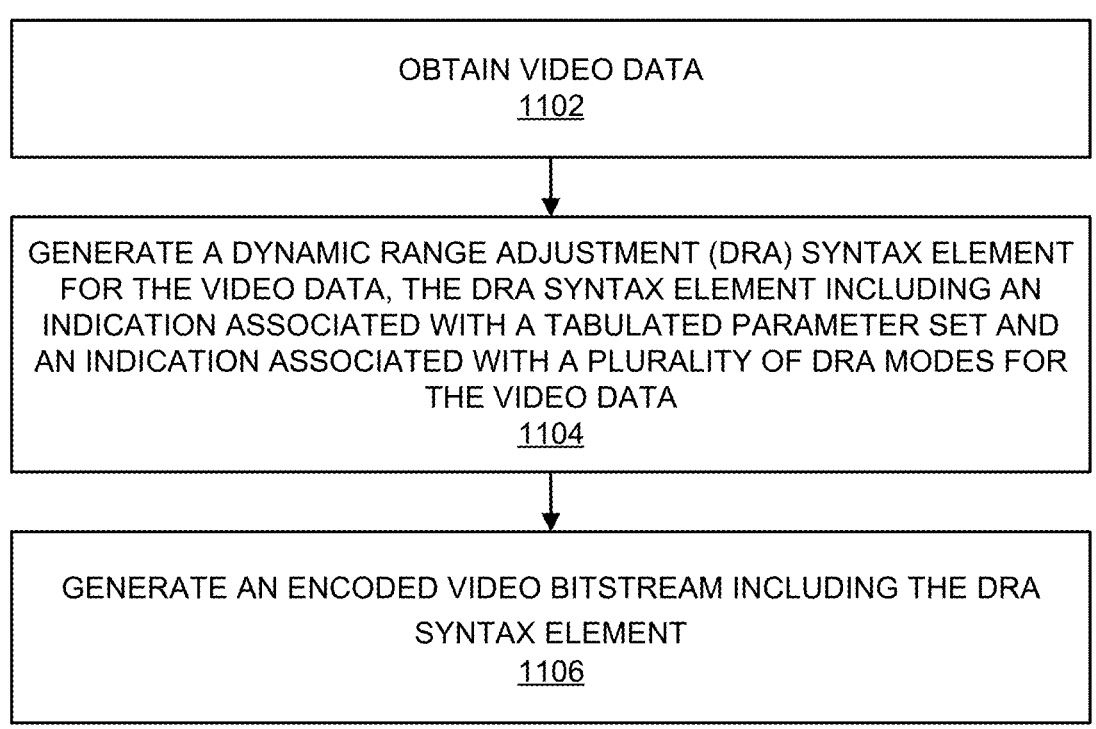
FIG. 11 is a flow diagram illustrating an example of a process of processing video data, in accordance with some examples.

FIG. 11 is a diagram illustrating an example of a process 1100 of processing video data, in accordance with some examples. In some aspects, the process 1100 is performed by an encoding device (e.g., the encoding device 104 of FIG. 1). In some aspects, the process 1100 is implemented in a system with a memory and one or more processors configured to perform the operations of the process 1100. In some aspects, the process 1100 is implemented in instructions stored in a computer readable storage medium. The instructions, when processed by one or more processors of a coding device (e.g., the encoding device 104), cause the apparatus to perform the operations of the process 1100. In other aspects, other implementations are possible in accordance with the details provided herein.

At block 1102, process 1100 includes obtaining video data. As described above, the video data include one or more pictures (or images or frames) that are to be encoded in accordance with a video coding standard (e.g., VVC, EVC, etc.) as described herein. At block 1104, process 1100 includes generating a dynamic range adjustment (DRA) table syntax element (e.g., dra_table_idx) for the video data. The DRA syntax element includes an indication (e.g., a value) associated with a plurality of DRA modes for the video data. For example, as described above, some examples can have a type 1 DRA mode for DRA configurations where chroma scales can be derived (e.g., by a decoding device) from luma scales. Some such examples can also have a type 2 DRA mode for DRA configurations where chroma scales are signaled independently from luma scales (e.g., for monochrome video data). In other examples, other combinations of modes are possible.

In block 1108, the process 1100 includes generating an encoded video bitstream including the DRA syntax element. The encoded video bitstream can include encoded pictures and syntax data. The syntax data can include one or more syntax structures, syntax elements, variables, and/or other information. In such examples, luma scale information is not used to derive chroma scale parameters for the DRA function, as described above. As noted above, a decoding device can receive the encoded video bitstream and can process one or more video samples of the video data using the DRA mode based on the indication of the DRA syntax element. For instance, to process the video data using the DRA mode, the decoding device can apply a DRA function associated with the DRA mode to the one or more video samples.

In some examples, the process 1100 can include one or more luma variables in the encoded video bitstream. The one or more luma variables denote or specify one or more luma scales for the one or more video samples using the DRA mode. In one illustrative example, the one or more luma variables include the lumaScale variable denoted above that denotes the luma scales of the video data. In some examples, as noted above, a decoding device can derive a chroma scale value (e.g., for the chromaScale variable) from the one or more luma variables for a DRA mode of the plurality of DRA modes.

In some cases, the indication from the DRA syntax element is associated with values in a range of 0 through 58 to specify the plurality of DRA modes. The plurality of DRA modes can be associated with a chroma scale derivation process. In some aspects, a DRA mode of the plurality of DRA modes is associated with a value of 58 for the indication of the DRA syntax element. In such aspects, one or more other modes of the plurality of DRA modes are associated with values of 1 through 57 for the indication of the DRA syntax element. In some cases, the indication of the DRA syntax element is fixed to a value of 58 when a chroma array type value associated with the DRA mode is equal to 0. In one illustrative example, as described above, a dra_table_idx value of 58 (e.g., an indication included in the DRA syntax element) is associated with a DRA mode for independent chroma signaling. In other examples, other dra_table_idx values can indicate other DRA modes or any given value can be associated with any DRA mode supported by a particular coding system.

In some examples, the process 1100 can include setting a value of a DRA joined scale flag based on the indication associated with the plurality of DRA modes. In one illustrative example, the DRA joined scale flag includes the DraJoinedScaleFlag variable discussed above. In some cases, DRA scale values associated with the DRA mode are fixed with a value of 1.

In some implementations, the processes (or methods) described herein (e.g., the process 900, the process 1000, the process 1100, and/or other processes described herein) can be performed by a computing device or an apparatus, such as the system 100 shown in FIG. 1. For example, the processes can be performed by the encoding device 104 shown in FIG. 1 and FIG. 12, by another video source-side device or video transmission device, by the decoding device 112 shown in FIG. 1 and FIG. 13, and/or by another client-side device, such as a player device, a display, or any other client-side device. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes 900, 1000, and 1100 are described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

In various aspects, benefits to a coding device or process are provided to allow flexible use of different formats (e.g., YCbCr, RGB, monochrome, etc.) to be efficiently integrated with chroma DRA processing. The modes described in various aspects to turn chroma DRA processing on and off can be implemented, for example, within existing standard syntax. In some examples, mode identification prior to DRA processing can be integrated with the standard syntax.

In some aspects, an output picture from a DRA process is cropped, using a cropping rectangle specified in the SPS for the sequence. Cropping an output picture can be performed in accordance with various aspects herein, including aspects consistent with VVC, HEVC, EVC, AV1, or other such standard based video processing. In some aspects, DRA operations described herein can be performed before cropping. In other aspects, DRA operations described herein can be performed after cropping.

In some aspects, a picture that is first for output (e.g., from a decoded picture buffer (DPB)) is selected as the one having the smallest value of a picture order count value (e.g., a PicOrderCntVal variable) of all pictures in the DPB marked as being needed for output. The selected picture includes a pic_width_in_luma_samples by pic_height_in_luma_samples array of luma samples currPicL and two PicWidthInSamplesC by PicHeightInSamplesC arrays of chroma samples currPicCb and currPicCr. The sample arrays currPicL, currPicCb and currPicCr correspond to decoded sample arrays SL, SCb and SCr. The variables can be used as temporal variables to simplify a video coding specification (e.g., VVC, HEVC, EVC, AV1, etc.).

Some aspects further include accessing variables denoting chroma scales from the video data (e.g., from an APS, derived, etc.) for use in processing the video data using the DRA mode or an indication associated with the DRA mode. In some aspects, some components of the chroma scales are signaled in the APS and some components of the chroma scales are derived. In some aspects, chroma scales are signaled in the APS (e.g., the chroma scales or a portion thereof are not derived). In some aspects, chroma scales are derived (e.g., the chroma scales or a portion thereof are not signaled in the APS). In various aspects, any functional combination of APS signaling and derivation of chroma scales from the video data can be used in processing the video data using the DRA mode.

Some aspects set a DRA joined scale flag based on the indication associated with a plurality of DRA modes (e.g., a plurality of DRA modes in the available value space of a DRA table, as described above, such as aspects with an independent mode and a joined mode). In some such aspects, when a dra_table_present_flag is equal to 1, DRA derivation processes are invoked with a selected picture as an input and an output picture as an output, otherwise, the sample arrays of the output picture are initialized by the sample arrays of the selected picture. In some such aspects, when a DRA joint mode flag is not set (e.g., a DRAJoinedSclaeFlag is equal to 0), an output value chroma scale is derived using a cb scale value (e.g., a dra_cb_scale_value of the DRA data syntax dra_data( ) noted above) and a cr scale value (e.g., a dra_cr_scale_value of the DRA data syntax dra_data( ) noted above). Such scale values can be signalled syntax elements in an independent mode, and derived from other components in a joined mode. In some such aspects, when the flag is set (e.g., a DRAJoinedSclaeFlag is equal to 1), standard chroma DRA processing is used.

In some aspects, a flag can be set according to a DRA syntax element value (e.g., the value of the dra_table_idx syntax element described above) or where the indication associated with the plurality of DRA modes is stored in a DRA syntax element. In some such examples, the DRA syntax element includes a value with a range of 0 through 58, inclusive. When the DRA syntax element value is equal to 58, the DRA joint mode flag is not set (e.g., a DRAJoinedSclaeFlag is equal to 0). When the DRA syntax element value has a value from 0 through 57, the DRA joint mode flag is set (e.g., a DRAJoinedSclaeFlag is equal to 1).

In some aspects, a chroma array type is signaled. In some such aspects, when the chroma array type has a certain predefined signal (e.g., 0), chroma DRA values are set to 1, and the DRA syntax element value is set to 58 (e.g., resulting in the DRA joint mode flag being not set).

In some aspects, the chroma DRA modes include a joint mode associated with YCbCr formats, and an independent mode associated with RGB formats.

In addition to the aspects described above, it will be apparent that additional aspects are possible within the scope of the details provided herein. For example, repeated operations or intervening operations are possible within the scope of processes 900, 1200, and/or other processes described herein and related processes. Additional variations on the above processes will also be apparent from the details described herein.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. The connection can include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 12:
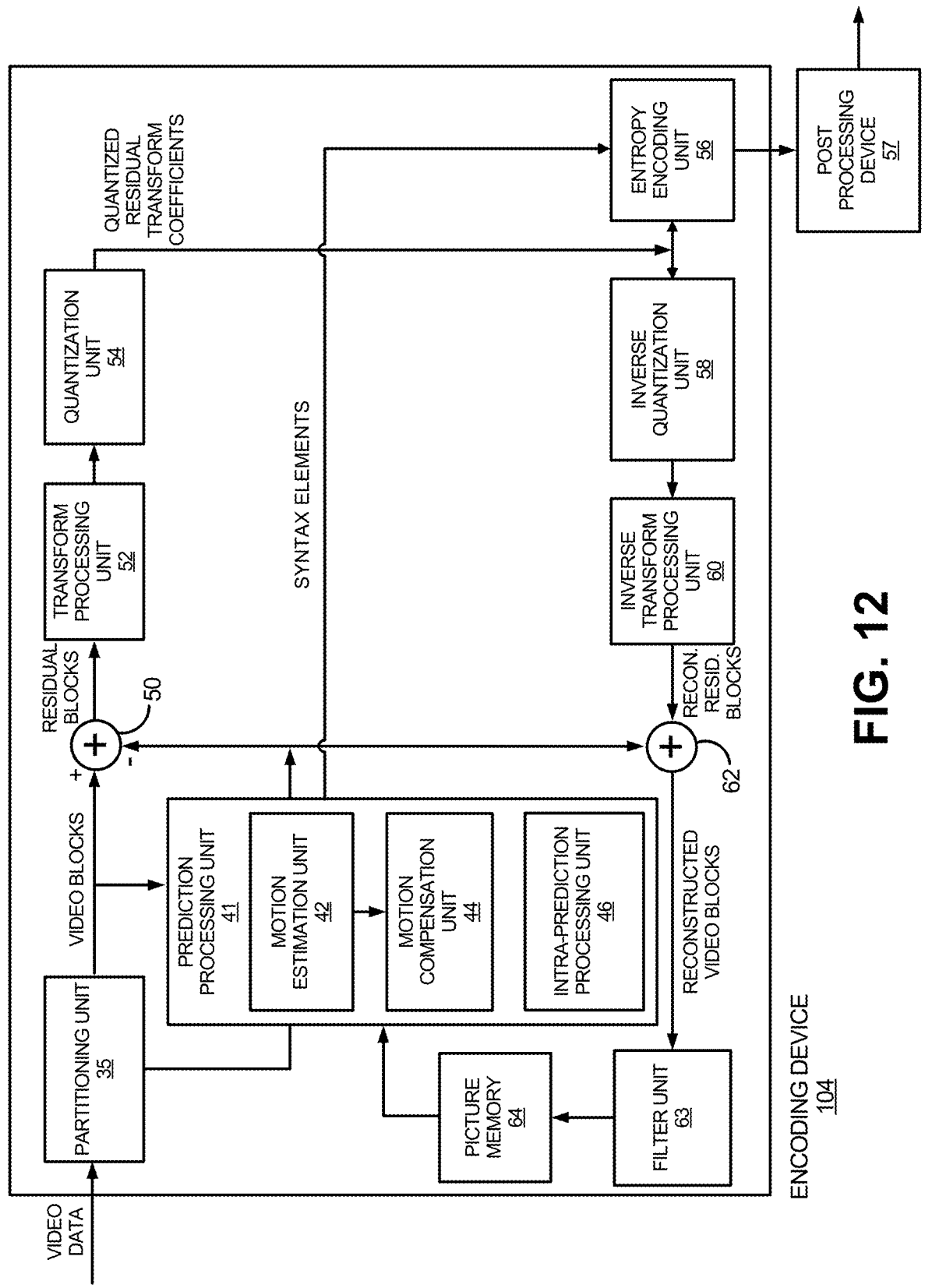
FIG. 12 is a block diagram illustrating an example video encoding device, in accordance with some examples.
Figure 13:
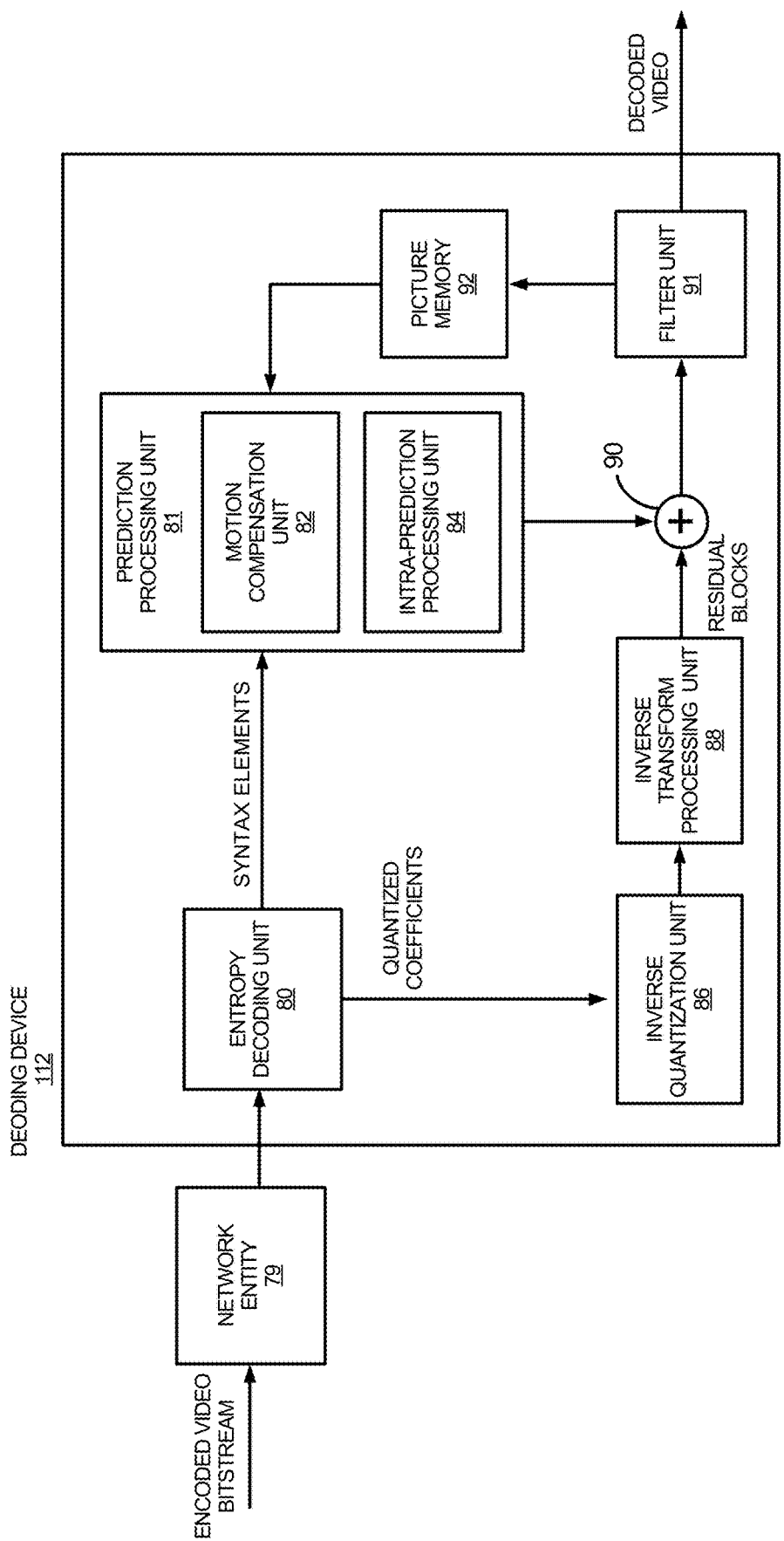
FIG. 13 is a block diagram illustrating an example video decoding device, in accordance with some examples.

Specific details of the encoding device 104 and the decoding device 112 are shown in FIG. 12 and FIG. 13, respectively. FIG. 12 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 12 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 12, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 12 represents an example of a video encoder configured to perform any of the techniques described herein, including the any of the processes or techniques described above. In some cases, some of the techniques of this disclosure may also be implemented by post processing device 57.

FIG. 14 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 12.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 14 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 14 represents an example of a video decoder configured to perform any of the techniques described herein, including the processes or techniques described above.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure are provided as follows:

Aspect 1: An apparatus for processing video data, comprising: a memory and a processor coupled to the memory. The processor is configured to: obtain at least one block of video data; predict one or more video samples for the at least one block; obtain a dynamic range adjustment (DRA) syntax element from the video data, the DRA syntax element including an indication associated with a tabulated parameter set and a plurality of DRA modes for the video data; and process the one or more video samples for the at least one block using a DRA mode based on the indication of the DRA syntax element.

Aspect 2: The apparatus of aspect 1, wherein, to process the one or more video samples using the DRA mode, the processor is configured to: apply a DRA function associated with the DRA mode to the one or more video samples, wherein luma scale information is not used to derive chroma scale parameters for the DRA function.

Aspect 3: The apparatus of any of aspects 1 or 2, wherein the processor is configured to: obtain one or more luma variables from the video data, the one or more luma variables denoting one or more luma scales for the one or more video samples.

Aspect 4: The apparatus of aspect 3, wherein the processor is configured to: derive a chroma scale value from the one or more luma variables for a DRA mode of the plurality of DRA modes.

Aspect 5: The apparatus of any of aspects 1 to 4, wherein the indication from the DRA syntax element is associated with values in a range of 0 through 58 to specify the plurality of DRA modes, the plurality of DRA modes being associated with a chroma scale derivation process.

Aspect 6: The apparatus of aspect 5, wherein a DRA mode of the plurality of DRA modes is associated with a value of 58 for the indication of the DRA syntax element, and wherein one or more other modes of the plurality of DRA modes are associated with values of 1 through 57 for the indication of the DRA syntax element.

Aspect 7: The apparatus of any of aspects 5 or 6, wherein the indication of the DRA syntax element is fixed to a value of 58 when a chroma array type value associated with the DRA mode is equal to 0.

Aspect 8: The apparatus of any of aspects 1 to 7, wherein the processor is further configured to: determine a value of a DRA joined scale flag based on the indication associated with the plurality of DRA modes.

Aspect 9: The apparatus of any of aspects 1 to 8, wherein DRA scale values associated with the DRA mode are fixed with a value of 1.

Aspect 10: The apparatus of any of aspects 1 to 9, wherein the processor is further configured to: process the one or more video samples using the DRA mode based on the indication of the DRA syntax element to decode the video data using the DRA mode.

Aspect 11: The apparatus of any of aspects 1 to 10, wherein the apparatus comprises a mobile device.

Aspect 12: The apparatus of any of aspects 1 to 11, further comprising a display coupled to the processor.

Aspect 13: The apparatus of any of aspects 1 to 12, further comprising a camera configured to capture one or more frames.

Aspect 14: A method of processing video data, the method comprising: obtain at least one block of video data; predict one or more video samples for the at least one block; obtain a dynamic range adjustment (DRA) syntax element from the video data, the DRA syntax element including an indication associated with a tabulated parameter set and a plurality of DRA modes for the video data; and process the one or more video samples for the at least one block using a DRA mode based on the indication of the DRA syntax element.

Aspect 15: The method of aspect 14, wherein processing the one or more video samples using the DRA mode includes: applying a DRA function associated with the DRA mode to the one or more video samples, wherein luma scale information is not used to derive chroma scale parameters for the DRA function.

Aspect 16: The method of any of aspects 14 or 15, further comprising: obtaining one or more luma variables from the video data, the one or more luma variables denoting one or more luma scales for the one or more video samples.

Aspect 17: The method of aspect 16, further comprising: deriving a chroma scale value from the one or more luma variables for a DRA mode of the plurality of DRA modes.

Aspect 18: The method of any of aspects 14 to 17, wherein the indication from the DRA syntax element is associated with values in a range of 0 through 58 to specify the plurality of DRA modes, the plurality of DRA modes being associated with a chroma scale derivation process.

Aspect 19: The method of aspect 18, wherein a DRA mode of the plurality of DRA modes is associated with a value of 58 for the indication of the DRA syntax element, and wherein one or more other modes of the plurality of DRA modes are associated with values of 1 through 57 for the indication of the DRA syntax element.

Aspect 20: The method of any of aspects 18 or 19, wherein the indication of the DRA syntax element is fixed to a value of 58 when a chroma array type value associated with the DRA mode is equal to 0.

Aspect 21: The method of any of aspects 14 to 20, further comprising: determining a value of a DRA joined scale flag based on the indication associated with the plurality of DRA modes.

Aspect 22: The method of any of aspects 14 to 21, wherein DRA scale values associated with the DRA mode are fixed with a value of 1.

Aspect 23: The method of any of aspects 14 to 22, further comprising: processing the one or more video samples using the DRA mode based on the indication of the DRA syntax element to decode the video data using the DRA mode.

Aspect 24: A non-transitory computer-readable medium having stored thereon instructions that, when executed by one or more processors, cause the one or more processors to perform operations according to any of aspects 1 to 23.

Aspect 25: An apparatus for processing video data comprising one or more means for performing operations according to any of aspects 1 to 23.

Aspect 26: An apparatus for processing video data, comprising a memory and a processor coupled to the memory. The processor is configured to: obtain video data; generate a dynamic range adjustment (DRA) syntax element for the video data, the DRA syntax element including an indication associated with a tabulated parameter set and a plurality of DRA modes for the video data; and generate an encoded video bitstream including the DRA syntax element.

Aspect 27: The apparatus of aspect 26, wherein luma scale information is not used to derive chroma scale parameters for a DRA function associated with a DRA mode from the plurality of DRA modes.

Aspect 28: The apparatus of any of aspects 26 or 27, wherein the processor is configured to: include one or more luma variables in the encoded video bitstream, the one or more luma variables denoting one or more luma scales for the video data using a DRA mode from the plurality of DRA modes.

Aspect 29: The apparatus of any of aspects 26 to 28, wherein the indication from the DRA syntax element is associated with values in a range of 0 through 58 to specify the plurality of DRA modes, the plurality of DRA modes being associated with a chroma scale derivation process.

Aspect 30: The apparatus of aspect 29, wherein a DRA mode of the plurality of DRA modes is associated with a value of 58 for the indication of the DRA syntax element, and wherein one or more other DRA modes of the plurality of DRA modes are associated with values of 1 through 57 for the indication of the DRA syntax element.

Aspect 31: The apparatus of any of aspects 29 or 30, wherein the indication of the DRA syntax element is fixed to a value of 58 when a chroma array type value associated with the DRA mode is equal to 0.

Aspect 32: The apparatus of any of aspects 26 to 31, wherein the processor is further configured to: set a DRA joined scale flag based on the indication associated with the plurality of DRA modes.

Aspect 33: The apparatus of any of aspects 26 to 32, wherein DRA scale values associated with a DRA mode from the plurality of DRA modes are fixed with a value of 1.

Aspect 34: The apparatus of any of aspects 26 to 33, wherein the apparatus comprises a mobile device.

Aspect 35: The apparatus of any of aspects 26 to 34, further comprising a display coupled to the processor.

Aspect 36: The apparatus of any of aspects 26 to 35, further comprising a camera configured to capture one or more frames.

Aspect 37: A method of processing video data, the method comprising: obtaining video data; generating a dynamic range adjustment (DRA) syntax element for the video data, the DRA syntax element including an indication associated with a tabulated parameter set and a plurality of DRA modes for the video data; and generating an encoded video bitstream including the DRA syntax element.

Aspect 38: The method of aspect 37, wherein luma scale information is not used to derive chroma scale parameters for a DRA function associated with a DRA mode from the plurality of DRA modes.

Aspect 39: The method of any of aspects 37 or 38, further comprising: including one or more luma variables in the encoded video bitstream, the one or more luma variables denoting one or more luma scales for the video data using a DRA mode from the plurality of DRA modes.

Aspect 40: The method of any of aspects 37 to 39, wherein the indication from the DRA syntax element is associated with values in a range of 0 through 58 to specify the plurality of DRA modes, the plurality of DRA modes being associated with a chroma scale derivation process.

Aspect 41: The method of aspect 40, wherein a DRA mode of the plurality of DRA modes is associated with a value of 58 for the indication of the DRA syntax element, and wherein one or more other DRA modes of the plurality of DRA modes are associated with values of 1 through 57 for the indication of the DRA syntax element.

Aspect 42: The method of any of aspects 40 or 41, wherein the indication of the DRA syntax element is fixed to a value of 58 when a chroma array type value associated with the DRA mode is equal to 0.

Aspect 43: The method of any of aspects 37 to 42, further comprising: setting a DRA joined scale flag based on the indication associated with the plurality of DRA modes.

Aspect 44: The method of any of aspects 37 to 43, wherein DRA scale values associated with a DRA mode from the plurality of DRA modes are fixed with a value of 1.

Aspect 45: A non-transitory computer-readable medium having stored thereon instructions that, when executed by one or more processors, cause the one or more processors to perform operations according to any of aspects 26 to 44.

Aspect 46: An apparatus for processing video data comprising one or more means for performing operations according to any of aspects 26 to 44.

What is claimed is:

1. An apparatus for processing video data, comprising:
a memory; and
a processor coupled to the memory and configured to:
obtain at least one block of video data;
predict one or more video samples for the at least one block;
obtain a dynamic range adjustment (DRA) syntax element from the video data, the DRA syntax element including an indication associated with a tabulated parameter set and a plurality of DRA modes for the video data, wherein the indication from the DRA syntax element is associated with values in a range of 0 through 58 to specify the plurality of DRA modes, the plurality of DRA modes being associated with a chroma scale derivation process; and
process the one or more video samples for the at least one block using a DRA mode based on the indication of the DRA syntax element.

2. The apparatus of claim 1, wherein, to process the one or more video samples using the DRA mode, the processor is configured to:
apply a DRA function associated with the DRA mode to the one or more video samples, wherein luma scale information is not used to derive chroma scale parameters for the DRA function.

3. The apparatus of claim 1, wherein the processor is configured to:
obtain one or more luma DRA parameters from the video data, the one or more luma DRA parameters denoting one or more luma scales for the one or more video samples using the DRA mode.

4. The apparatus of claim 3, wherein the processor is configured to:
derive a chroma scale value from the one or more luma DRA parameters for a DRA mode of the plurality of DRA modes.

5. The apparatus of claim 1, wherein a DRA mode of the plurality of DRA modes is associated with a value of 58 for the indication of the DRA syntax element, and wherein one or more other modes of the plurality of DRA modes are associated with values of 1 through 57 for the indication of the DRA syntax element.

6. The apparatus of claim 5, wherein the indication of the DRA syntax element is fixed to a value of 58 when a chroma array type value associated with the DRA mode is equal to 0.

7. The apparatus of claim 1, wherein the processor is further configured to:
determine a value of a DRA joined scale flag based on the indication associated with the plurality of DRA modes.

8. The apparatus of claim 1, wherein DRA scale values associated with the DRA mode are fixed with a value of 1.

9. The apparatus of claim 1, wherein the processor is further configured to:
process the one or more video samples using the DRA mode based on the indication of the DRA syntax element to decode the video data using the DRA mode.

10. The apparatus of claim 1, wherein the apparatus comprises a mobile device.

11. The apparatus of claim 1, further comprising a display coupled to the processor.

12. The apparatus of claim 1, further comprising a camera configured to capture one or more frames.

13. A method of processing video data, the method comprising:
obtain at least one block of video data;
predict one or more video samples for the at least one block;
obtain a dynamic range adjustment (DRA) syntax element from the video data, the DRA syntax element including an indication associated with a tabulated parameter set and a plurality of DRA modes for the video data, wherein the indication from the DRA syntax element is associated with values in a range of 0 through 58 to specify the plurality of DRA modes, the plurality of DRA modes being associated with a chroma scale derivation process; and
process the one or more video samples for the at least one block using a DRA mode based on the indication of the DRA syntax element.

14. The method of claim 13, wherein processing the one or more video samples using the DRA mode includes:
applying a DRA function associated with the DRA mode to the one or more video samples, wherein luma scale information is not used to derive chroma scale parameters for the DRA function.

15. The method of claim 13, further comprising:
obtaining one or more luma DRA parameters from the video data, the one or more luma DRA parameters denoting one or more luma scales for the one or more video samples.

16. The method of claim 15, further comprising:
deriving a chroma scale value from the one or more luma DRA parameters for a DRA mode of the plurality of DRA modes.

17. The method of claim 13, wherein a DRA mode of the plurality of DRA modes is associated with a value of 58 for the indication of the DRA syntax element, and wherein one or more other modes of the plurality of DRA modes are associated with values of 1 through 57 for the indication of the DRA syntax element.

18. The method of claim 17, wherein the indication of the DRA syntax element is fixed to a value of 58 when a chroma array type value associated with the DRA mode is equal to 0.

19. The method of claim 13, further comprising:
determining a value of a DRA joined scale flag based on the indication associated with the plurality of DRA modes.

20. The method of claim 13, wherein DRA scale values associated with the DRA mode are fixed with a value of 1.

21. The method of claim 13, further comprising:
processing the one or more video samples using the DRA mode based on the indication of the DRA syntax element to decode the video data using the DRA mode.

22. An apparatus for processing video data, comprising:
a memory; and
a processor coupled to the memory and configured to:
  obtain video data;
  generate a dynamic range adjustment (DRA) syntax element for the video data, the DRA syntax element including an indication associated with a tabulated parameter set and a plurality of DRA modes for the video data, wherein the indication from the DRA syntax element is associated with values in a range of 0 through 58 to specify the plurality of DRA modes, the plurality of DRA modes being associated with a chroma scale derivation process; and
  generate an encoded video bitstream including the DRA syntax element.

23. The apparatus of claim 22, wherein luma scale information is not used to derive chroma scale parameters for a DRA function associated with a DRA mode from the plurality of DRA modes.

24. The apparatus of claim 22, wherein the processor is configured to:
include one or more luma DRA parameters in the encoded video bitstream, the one or more luma DRA parameters denoting one or more luma scales for the video data using a DRA mode from the plurality of DRA modes.

25. The apparatus of claim 22, wherein a DRA mode of the plurality of DRA modes is associated with a value of 58 for the indication of the DRA syntax element, and wherein one or more other DRA modes of the plurality of DRA modes are associated with values of 1 through 57 for the indication of the DRA syntax element.

26. The apparatus of claim 25, wherein the indication of the DRA syntax element is fixed to a value of 58 when a chroma array type value associated with the DRA mode is equal to 0.

27. The apparatus of claim 22, wherein the processor is further configured to:
set a DRA joined scale flag based on the indication associated with the plurality of DRA modes.

28. The apparatus of claim 22, wherein DRA scale values associated with a DRA mode from the plurality of DRA modes are fixed with a value of 1.

29. The apparatus of claim 22, wherein the apparatus comprises a mobile device.

30. The apparatus of claim 22, further comprising a display coupled to the processor.

* * * * *